(12) United States Patent
Burge et al.

(10) Patent No.: US 8,090,317 B2
(45) Date of Patent: Jan. 3, 2012

(54) PERSONAL WIRELESS NETWORK USER BEHAVIOR BASED TOPOLOGY

(75) Inventors: Benjamin D. Burge, Shaker Heights, OH (US); Ronald N. Isaac, Shrewsbury, MA (US); Joji Ueda, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 746 days.

(21) Appl. No.: 12/184,916

(22) Filed: Aug. 1, 2008

(65) Prior Publication Data

US 2010/0027463 A1    Feb. 4, 2010

(51) Int. Cl.
*H04B 7/00* (2006.01)
*H04B 17/00* (2006.01)

(52) U.S. Cl. .................. 455/41.3; 455/67.11; 455/115.1
(58) Field of Classification Search ............... 455/422.1, 455/41.2, 420, 456.3, 66.1, 67.11, 100, 115.1, 455/41.3
See application file for complete search history.

(56) References Cited

U.S. PATENT DOCUMENTS

| | | | |
|---|---|---|---|
| 6,026,303 A | 2/2000 | Minamisawa | |
| 6,684,339 B1 | 1/2004 | Willig | |
| 6,834,192 B1 * | 12/2004 | Watanabe et al. | 455/444 |
| 6,928,264 B2 | 8/2005 | Botteck | |
| 7,193,991 B2 * | 3/2007 | Melpignano et al. | 370/352 |
| 7,222,166 B2 * | 5/2007 | Treister et al. | 709/223 |
| 7,447,746 B2 * | 11/2008 | Yamaguchi et al. | 709/208 |
| 7,694,160 B2 | 4/2010 | Esliger et al. | |
| 7,715,790 B1 | 5/2010 | Kennedy | |
| 7,899,397 B2 | 3/2011 | Kumar | |
| 2001/0012757 A1 | 8/2001 | Boyle | |
| 2003/0018696 A1 | 1/2003 | Sanchez et al. | |
| 2003/0054765 A1 | 3/2003 | Botteck | |
| 2004/0044718 A1 | 3/2004 | Ferstl et al. | |
| 2004/0128382 A1 | 7/2004 | Shimoda et al. | |
| 2005/0033816 A1 | 2/2005 | Yamaguchi et al. | |
| 2005/0278520 A1 | 12/2005 | Hirai et al. | |
| 2006/0072525 A1 | 4/2006 | Hillyard et al. | |
| 2006/0129637 A1 | 6/2006 | Yoshida | |
| 2006/0270395 A1 | 11/2006 | Dhawan et al. | |
| 2007/0254728 A1 | 11/2007 | Moallemi et al. | |
| 2007/0294408 A1 | 12/2007 | Jackson | |
| 2008/0043824 A1 | 2/2008 | Jacobs et al. | |
| 2009/0275367 A1 | 11/2009 | Reinisch et al. | |

FOREIGN PATENT DOCUMENTS

| | | |
|---|---|---|
| EP | 1548985 A1 | 6/2005 |
| EP | 1624628 A2 | 2/2006 |
| WO | 0103379 A1 | 1/2001 |
| WO | 03007552 A2 | 1/2003 |

(Continued)

OTHER PUBLICATIONS

International Preliminary Report on Patentability dated Nov. 11, 2010 for PCT/US2009/038782.

(Continued)

*Primary Examiner* — Sonny Trinh

(57) ABSTRACT

Point-to-point links making up a wireless network in which the point-to-point links connect at least personal portable devices are dynamically altered (i.e., new point-to-point links are established and/or other point-to-point links are removed) in response to recurring comparisons of the extents of interaction of each of the personal portable devices with the wireless network to increase the resiliency of the wireless network to the observed behavior of the user of the personal portable devices in changing which personal portable devices are within the network at any given time.

40 Claims, 8 Drawing Sheets

FOREIGN PATENT DOCUMENTS

| WO | 03084192 A1 | 10/2003 |
| WO | 2006028547 A1 | 3/2006 |
| WO | 2007121476 A1 | 10/2007 |
| WO | 2007127878 A1 | 11/2007 |

OTHER PUBLICATIONS

International Preliminary Report on Patentability dated Oct. 25, 2010 for PCT/US2009/039310.

International Preliminary Report on Patentability dated Jun. 10, 2010 for PCT/US2009/039309.

International Search Report and Written Opinion dated Aug. 20, 2009 for PCT/US2009/038782.

International Search Report and Written Opinion dated Sep. 15, 2009 for PCT/US2009/039309.

International Search Report and Written Opinion dated Aug. 21, 2009 for PCT/US2009/039310.

Basu et al., A Novel Approach for Execution of Distributed Tasks on Mobile Ad Hoc Networks, Wireless Communications and Networking Conference, 2002, IEEE, Piscataway, NJ, vol. 2, Mar. 17, 2002, pp. 579-585.

Duran-Limon et al., A Resource and QoS Management Framework for a Real-Time Event System in Mobile Ad Hoc Environments, Object-Oriented Real-Time Dependable Systems, 2003, The Ninth IEEE International Workshop on Anacapri, Italy, Piscataway, NJ, pp. 217-217.

Singh et al., Electing Leaders Based Upon Performance: the Delay Model, International Conference on Distributed Computing Systems, Arlington, TX, 1991, IEEE Vol. Conf. 11, pp. 464-471.

Yen et al., A Genetic Algorithm for Energy-Efficient Based Multicast Routing on MANETS, Computer Communications, Elsevier Science Publishers BV, Amsterdam, NL, vol. 31, No. 10, 2008, pp. 2632-2641.

* cited by examiner

PERSONAL WIRELESS NETWORK USER BEHAVIOR BASED TOPOLOGY

FIELD

This description relates to automated adjustment of personal wireless network topography based on observed habits of a user.

BACKGROUND

It has become commonplace for people carry a multitude of personal portable devices capable of interacting through a personal wireless network (e.g., cell phones, PDAs, PIMs, MP3 players, PNDs, digital cameras, wireless headsets, wireless earpieces, wireless microphones, etc.) to cooperate to carry out various tasks. Such tasks include listening to music, watching a video, engaging in a telephone conversation, reading emails, exchanging text messages, entering data, editing data, printing data, etc.

Such personal portable devices are meant to be easily movable from place to place by being easily carried on the persons of their users in some way (e.g., in a pocket, strapped to an arm or wrist, worn on the head, suspended from a neck or shoulder strap, clipped to a belt or lapel, etc.). Despite numerous benefits afforded by so easily movable, this very same movable nature of these devices often encourages a user of such personal portable devices to frequently change the combination of personal portable devices that they carry with them at any given time. This necessarily results in the personal wireless network that is formed about their person between these personal portable devices being redefined with each change in that combination.

Such frequent redefining of a personal wireless network can cause undesirable disruptions to the operation of a personal wireless network, possibly resulting in one or more personal portable devices having an undefined status that inhibits their participation in any personal wireless network. Further, opportunities for optimizing the interchange of commands and data between personal portable devices may be precluded by such frequent occurrences of redefining a personal wireless network, especially where personal portable devices are caused to engage in seemingly chaotic efforts to once again locate each other and reestablish the personal wireless network after each such occurrence.

SUMMARY

Point-to-point links making up a wireless network in which the point-to-point links connect at least personal portable devices are dynamically altered (i.e., new point-to-point links are established and/or other point-to-point links are removed) in response to recurring comparisons of the extents of interaction of each of the personal portable devices with the wireless network to increase the resiliency of the wireless network to the observed behavior of the user of the personal portable devices in changing which personal portable devices are within the network at any given time. In essence, the wireless network is automatically reorganized as this behavior of the user is observed over time in an effort to minimize disruptions to the wireless network resulting from the removal of personal portable devices by the user by positioning the personal portable devices that have lesser extents of interaction with the network (i.e., are in some way used by the user with the network to a lesser extent) at positions from which the user may remove them that will minimize the quantity or importance of the point-to-point links that are lost as a result of such removals.

In one aspect, a first personal portable device interacts with a wireless network having a topology having a first point-to-point link to directly connect the first personal portable device to a second personal portable device. The first personal portable device comprises a first processor; a first wireless transceiver operable by the first processor to enable communications across the wireless network with the second personal portable device; and a first storage accessible to the first processor in which is stored a first routine comprising a sequence of instructions. When the sequence of instructions is executed by the first processor, the first processor is caused to store within the first personal portable device an indication of a first extent of interaction of the first personal portable device with the wireless network; receive through the first wireless transceiver an indication of a second extent of interaction of the second personal portable device with the wireless network; compare the first and second extents of interaction on a recurring basis; and cooperate with at least one processor of at least one other personal portable device within the wireless network to move the first personal portable device from occupying one position within the topology of the wireless network to occupying a different position within the topology of the network in response to a result of a comparison between the first and second extents of interaction.

Implementations may include, and are not limited to, one or more of the following features. The first extent of interaction may be measured as a percentage of a time period during which the first personal portable device is within the wireless network such that the first personal portable device is accessible to the second personal portable device through the wireless network. The first processor may be further caused to cooperate with other processors of other personal portable devices in comparing the first and second extents of interaction. The topology of the wireless network may comprise a star topology, and the first processor may cooperate with another processor of another personal portable device to change positions within the star topology (e.g., between the center position and an endpoint position) in response to the result of the comparison between the first and second extents of interaction. The topology of the wireless network may comprise a chain topology, and the first processor may cooperate with another processor of another personal portable device to change positions within the chain topology (e.g., between a midpoint position and an endpoint position) in response to the result of the comparison between the first and second extents of interaction.

Further, the first processor of the first personal portable device may cooperate with a second processor of the second personal portable device and a third processor of a third personal portable device through the wireless network to exchange a first audio data to enable a user to hear audio represented by the first audio data; where the second personal portable device is linked through a second point-to-point link with the third personal portable device such that at least a portion of the first audio data is relayed between the first and third personal portable devices through the second personal portable device; and processors of each of the first, second and third personal portable devices stores data indicating a personal portable device that processors of each will attempt to establish a new point-to-point link with in response to the removal of the second personal portable device from the network. One of these three personal portable devices may be a wireless earphone able to audibly output a first audio channel of the first audio data, and another of these three personal portable devices may be a wireless headset able to audibly output a second audio channel of the first audio data and also able to detect a second audio. One of these three personal portable devices may be a wireless earphone able to output the first audio data, and another of these three personal portable devices is a wireless remote control capable of enabling control of a characteristic of the first audio.

In one aspect, a method of increasing resiliency of a wireless network comprising a plurality of point-to-point links linking a plurality of personal portable devices occupying positions within the topology of the wireless network comprises comparing a first extent of interaction with the wireless network of a first personal portable device of the plurality of personal portable devices with a second extent of interaction with the wireless network of a second personal portable device on a recurring basis; and causing at least the first and second personal portable devices to cooperate to move the first personal portable device from one position in the topology of the wireless network to a different position in the topology of the wireless network in response to a result of comparing the first and second extents of interaction.

Implementations may include, and are not limited to, one or more of the following features. The first extent of interaction may be measured as a percentage of a time period during which the first personal portable device is within the wireless network such that the first personal portable device is accessible to the second personal portable device through the wireless network. The first personal portable device is caused to cooperate with other personal portable devices in comparing the first and second extents of interaction. The topology of the wireless network may comprise a star topology, and the first personal portable device may cooperate with another personal portable device to change positions within the star topology (e.g., between the center position and an endpoint position) in response to the result of the comparison between the first and second extents of interaction. The topology of the wireless network may comprise a chain topology, and the first personal portable device may cooperate with another personal portable device to change positions within the chain topology (e.g., between a midpoint position and an endpoint position) in response to the result of the comparison between the first and second extents of interaction.

Further, the first personal portable device may cooperate with the second personal portable device and a third personal portable device through the wireless network to exchange a first audio data to enable a user to hear audio represented by the first audio data; where the second personal portable device is linked through a second point-to-point link with the third personal portable device such that at least a portion of the first audio data is relayed between the first and third personal portable devices through the second personal portable device; and each of the first, second and third personal portable devices stores data indicating a personal portable device that each will attempt to establish a new point-to-point link with in response to the removal of the second personal portable device from the network. One of these three personal portable devices may be a wireless earphone able to audibly output a first audio channel of the first audio data, and another of these three personal portable devices may be a wireless headset able to audibly output a second audio channel of the first audio data and also able to detect a second audio. One of these three personal portable devices may be a wireless earphone able to output the first audio data, and another of these three personal portable devices is a wireless remote control capable of enabling control of a characteristic of the first audio.

DESCRIPTION

Figure 1C:
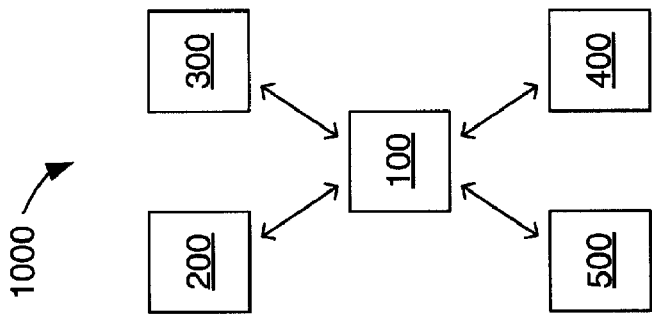
FIGS. 1a, 1b, 1c, 1d and 1e are block diagram depicting responses of personal portable devices in a wireless network having a star topology to the addition and removal of different ones of those personal portable devices.
Figure 1B:
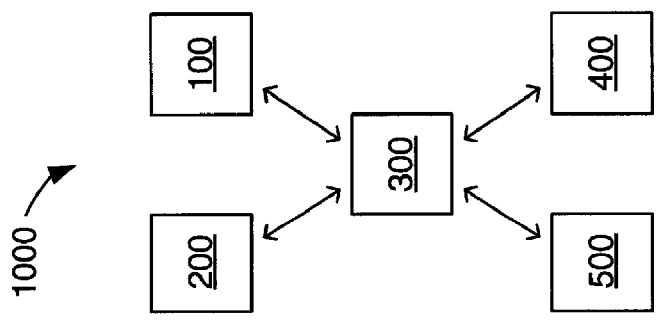
Figure 1A:
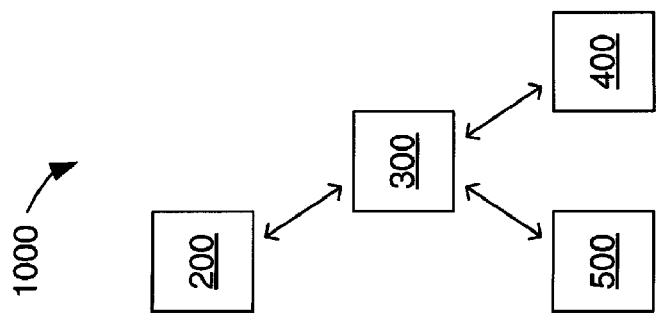
Figure 1E:
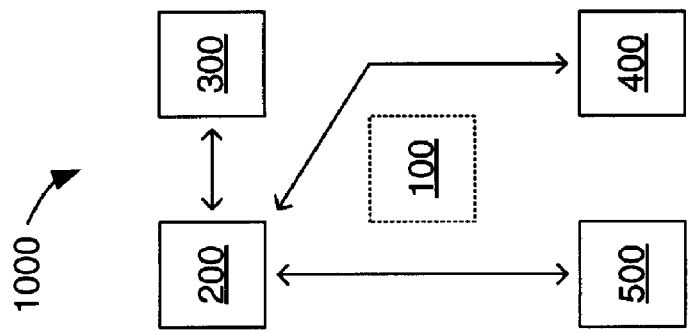
Figure 1D:
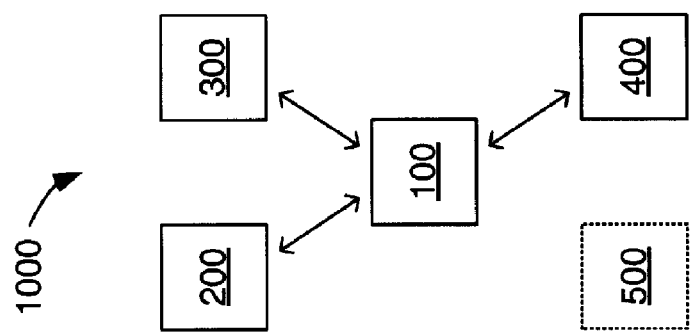

FIGS. 1a, 1b and 1c, taken together, depict the responses of personal portable devices already within a wireless network 1000 to the addition of another personal portable device to the network 1000. FIGS. 1d and 1e each depict the responses of personal portable devices remaining within the network 1000 to the removal of a personal portable device from the network 1000. More specifically, FIG. 1a depicts the network 1000 having a star topology with a personal portable device 300 at the center and personal portable devices 200, 400 and 500 each at an endpoint. FIG. 1b depicts the addition of a personal portable device 100 to the network 1000 of FIG. 1a at an endpoint. FIG. 1c depicts the swapping of positions of the personal portable devices 100 and 300 in the star topology of the network 1000 from what was depicted in FIG. 1b in response to comparisons of the extent of the interactions of each of the personal portable devices with the network 1000. FIG. 1d depicts the manner in which such comparisons determine the response to the removal of the personal portable device 500 from an endpoint of the network 1000 of FIG. 1c. FIG. 1e depicts the manner in which such comparisons determine the response to the removal of the personal portable device 100 from the center of the network 1000 of FIG. 1c.

The star topology of the network 1000 is made up of point-to-point links, with whichever one of the personal portable devices 100, 200, 300, 400 and 500 that occupies the center of the star topology being linked to each one of these personal portable devices occupying an endpoint via a separate point-to-point link. The technology on which the network 1000 depicted throughout FIGS. 1a-e is based may be any of a wide variety of types employing RF signals, infrared signals, or any of a variety of other forms of wireless transmission media. Where RF signals are employed, the frequencies of those signals and various aspects of the protocols and the transfers of commands and data may be selected to conform to any of a variety of wireless networking standards, including and not limited to, the Bluetooth specification promulgated by the Bluetooth Special Interest Group of Bellevue, Wash., and/or one of the variety of forms of wireless local area network (WLAN) promulgated by the Institute of Electrical and Electronics Engineers, Inc. (IEEE®) of Piscataway, N.J., in at least the IEEE 802 series of standards.

Each of the personal portable devices 100, 200, 300, 400 and 500 may be any of a variety of types personal portable device, including and not limited to, a personal data assistant (PDA), a personal information manager (PIM), a personal navigation devices (PND), a cellular telephone, a MP3 audio file player, a MPEG video file player, a digital camera, a wireless headset, a wireless earpiece, and a wireless microphone. Different ones of these personal portable devices may cooperate through the network 1000 with different other ones of these personal portable devices to perform any of a variety of tasks. By way of example, among these personal portable devices may be a cellular telephone and a wireless in-ear headset cooperating through the network 1000 to enable a user of both to participate in a cellular telephone call or to play recorded audio stored on the cellular telephone through the headset. By way of another example, among these personal portable devices may be a wireless data storage device and a wireless data terminal cooperating through the network 1000 to enable a user of both to access and edit data stored on the data storage device through the wireless data terminal.

Turning to FIG. 1*a*, the network 1000 is already formed between the personal portable devices 200, 300, 400 and 500. With the personal portable device 300 at the center and each of the personal portable devices 200, 400 and 500 at an endpoint, each of the of personal portable devices 200, 400 and 500 has as point-to-point link with the personal portable device 300. As a result, any communications between the personal portable devices 200, 400 and 500 must necessarily be relayed through the personal portable device 300. Depending on the technology on which the network 1000 is based, the user of these personal portable devices may have been required to engage in a procedure in which the user operated each of these personal portable devices to prepare them to form point-to-point links therebetween in order to form the network 1000. If the network 1000 is at least partially based on the Bluetooth specification, then this procedure may be the pairing or registration procedure described in the Bluetooth specification in which codes uniquely identifying each of these personal portable devices and/or encryption keys are exchanged among them.

It should be noted that the allocation of relative positions of the personal portable devices 200, 300, 400 and 500 is dynamic, and therefore, FIG. 1*a* depicts only one possible allocation of those relative positions with the personal portable device 300 positioned at the center of the network 1000. More specifically, the personal portable devices 200, 300, 400 and 500 cooperate to automatically alter the point-to-point links between them to change their relative positions within the network 1000 in response to recurring comparisons of the extent of the interactions that each of these personal portable devices has with the network 1000. As will be explained in greater detail, these comparisons entail comparing one or more factors concerning the interaction of each of these personal portable devices with the network 1000, including and not limited to, relative percentage of time during which each device remains within the network 1000, relative percentage of time during which each personal portable device exchanges data with at least one other personal portable device through the network 1000, and relative quantities of data exchanged by each personal portable devices with another personal portable device through the network 1000 within a given period of time. The results of such comparisons are employed to determine which one of the personal portable devices 200, 300, 400 and 500 interacts with the network 1000 to the greatest extent, and should therefore, be positioned at the center of the network 1000 in an effort to enhance the stability of the topography of the network 1000. A presumption is made that the personal portable device that interacts with the network 1000 to the greatest extent is the personal portable device that is least likely to be removed from the network 1000 by the user.

The intention is to at least minimize the number of occasions on which the network 1000 is essentially destroyed due to the removal of the personal portable device at the center. As those skilled in the art will readily recognize, the loss of whichever personal portable device is at the center of a star topology network disrupts all communication between the remaining personal portable devices. In the case of the network 1000, such disruption results from the loss of all of the point-to-point links caused by the removal of whatever personal portable device occupied the center. Such an event disrupts any function requiring continuing communication between two or more of the remaining personal portable devices. Such a function will remain disrupted until the network is recreated between the remaining personal portable devices with one of those remaining personal portable devices now occupying the center so that communication is restored. However, such an effort to recreate the network can take time as the remaining personal portable devices each engage in separate and uncoordinated efforts to locate each other, establish new point-to-point links on an uncoordinated basis, communicate through those new point-to-point links to enable cooperation to determine which personal portable device will occupy the center, and then reorganize the point-to-point links to conform to the selection of which personal portable device occupies the center. Aside from the disruption in functionality for whatever amount of time may be required to recreate the network, there is also the possibility that one of the remaining personal portable devices may somehow fail to form a new point-to-point link with any of the others as a result of collisions between the separate and uncoordinated efforts by the personal portable devices to locate each other. Further, and depending on the protocols used in establishing the new point-to-point links, there is the possibility of an unwanted additional device somehow being allowed to form a point-to-point link with one of the personal portable devices during the recreation effort and eventually becoming included in the recreated network such that network security is compromised.

In contrast to the removal of a personal portable device occupying the center of a star topology network, the removal of a personal portable device occupying an endpoint disrupts only the point-to-point link between that removed personal portable device and the personal portable device at the center, leaving the rest of the network unaffected. As a result, there is no need to recreate a network that has been destroyed, and functions entailing cooperation between the remaining multiple personal portable devices are able to continue without any interruption. Clearly, this sort of comparably minimal effect on a network is greatly preferable.

Turning to FIG. 1*b*, regardless of the manner in which the network 1000 with the configuration depicted in FIG. 1*a* was formed, the user of the personal portable devices 200, 300, 400 and 500 causes the network 1000 to be altered by adding the personal portable device 100. For sake of discussion, it will be presumed that the personal portable device 100 has not previously interacted with the network 1000, and therefore, as depicted in FIG. 1*b*, the personal portable device 100 is at least initially given an endpoint position in the topology of the network 1000. In some embodiments, an initial placement of the personal portable device 100 at an endpoint may be a default automatic response to the addition of any entirely new personal portable device to the network 1000. This may be based on an assumption that the user may occasionally add a personal portable device to the network 1000 on only a temporary basis, and therefore, it may not be desirable to allow the selection of which personal portable device occupies the center position to be immediately changed in response to the addition of a personal portable device that the user may not intend to keep in the network 1000 for very long. In other embodiments, and as will be explained in more detail, such an initial placement may automatically arise from the results of the comparisons of the extent of the interactions that each personal portable device has with the network 1000. Since the personal portable device 100 has not previously interacted with the network 1000, at all, its extent of interaction with the network 1000 would clearly be less than that of all of the other personal portable devices within the network 1000, and the placement of the personal portable device 100 at an endpoint would be the expected result. In being placed at an endpoint, a single point-to-point link is established between the newly added personal portable device 100 and the personal portable device 300 occupying the center.

Turning to FIG. 1c, regardless of the manner or mechanism by which the personal portable device 100 is given an endpoint point position upon being added to the network 1000, the passage of time and comparisons of the extent of the interactions of each of the personal portable devices 100, 200, 300, 400 and 500 with the network 1000 as the user has made use of these personal portable devices has subsequently resulted in the relative positions of the personal portable devices 100 and 300 being exchanged as a result of the personal portable device 100 being determined to have more extensive interactions with the network 1000. In some embodiments, the personal portable devices 100 and 300 may cooperate to alter the point-to-point links of the network 1000 by cooperating to establish new point-to-point links between the personal portable device 100 and other personal portable devices that are to continue occupying endpoints, and cooperating to remove point-to-point links between the personal portable device 300 and personal portable devices other than the personal portable device 100. In other embodiments, the personal portable device 100 and 300 swap identities on the network 1000 with the personal portable device 100 now presenting itself to other personal portable devices in the network 1000 as if it were the personal portable device 300, and vice versa. As a result, the more recently added personal portable device 100 now occupies the center of the star topology of the network 1000, and the personal portable device 300 now occupies an endpoint.

Turning to FIG. 1d, the user subsequently removes the personal portable device 500 from the network 1000 whilst having the configuration of point-to-point links depicted in FIG. 1c. For the sake of discussion, it is presumed that the personal portable device 500 remained at an endpoint position since the addition of the personal portable device 100 depicted in FIG. 1b and since the swapping of positions of the personal portable devices 100 and 300 depicted in FIG. 1c. As a result of the personal portable device 500 being at an endpoint position within the network 1000 at the time of its removal from the network 1000, only the point-to-point link between the personal portable devices 100 and 500 is lost, while the rest of the network 1000 is unaffected. In other words, FIG. 1d depicts the desired results of the aforedescribed automatic movement of personal portable devices between positions in the network 1000 in response to recurring comparisons of extents of interaction between each of the personal portable devices 100, 200, 300, 400 and 500 with the network 1000. Functions requiring cooperation between the remaining personal portable devices 100, 200, 300 and 400 remain uninterrupted, and any need to engage in recreating the network 1000 is precluded. Further, if at some later time the user once again brings the personal portable device 500 back within the network 1000, it is likely the that personal portable device 500 would once again be given an endpoint position, since its removal from the network 1000 would likely result in the personal portable device 500 being determined to have interacted with the network 1000 to a lesser extent than one or more of the personal portable devices 100, 200, 300 and 400.

Turning to FIG. 1e, in contrast to what was depicted in FIG. 1d, the user removes the personal portable device 100 whilst the network 1000 has the configuration of point-to-point links depicted in FIG. 1c. For the sake of discussion, it is presumed that the personal portable device 100 remained at the center of the network 1000 since its position was swapped with that of the personal portable device 300 in FIG. 1c. Unfortunately, the removal of the personal portable device 100 from the center of the network 1000 has the undesirable result of breaking all of the point-to-point links between the personal portable device 100 and each of the remaining personal portable devices 200, 300, 400 and 500. In other words, FIG. 1e depicts an occurrence that was sought to be avoided through the aforedescribed automatic movement of personal portable devices between positions in the network 1000 in response to recurring comparisons of extents of interaction between each of the personal portable devices 100, 200, 300, 400 and 500 with the network 1000. As those familiar with wireless networks having a star topology and based on any technology will readily recognize, it is not possible to entirely avoid instances of a device occupying the center of such a network being removed from that network, ceasing to function, or in some way having its wireless communications with other devices on that network being lost or interfered with.

However, to avoid the kind of previously described undesirable outcome of an uncoordinated effort by the remaining personal portable devices 200, 300, 400 and 500 to recreate the network 1000, in some embodiments, the same recurring comparisons of extent of interaction of each of the personal portable devices 100, 200, 300, 400 and 500 with the network 1000 are further employed to establish a line of succession among these personal portable devices that dictates which one among them will automatically take over for the personal portable device at the center if that personal portable device is removed from the network. This line of succession progresses in an order of decreasing extent of interaction with the network 1000 such that the next personal portable device in the line of succession is always the personal portable device with the greatest extent of interaction with the network 1000 out of all of the remaining personal portable devices.

Preferably, each of the personal portable devices 100, 200, 300, 400 and 500 stores data indicating this line of succession such that it is possible for all of the remaining personal portable devices 200, 300, 400 and 500 to immediately assume their new positions in the network 1000 upon each detecting the removal of the personal portable device 100 from the network 1000. Indeed, FIG. 1e depicts the establishment of new point-to-point links between the personal portable device 200 and each of the personal portable devices 300, 400 and 500 in response to the removal of the personal portable device 100 (and the accompanying loss of the point-to-point links between the personal portable device 100 and the other personal portable devices). As this suggests, recurring comparisons of the extent of interaction of each of these personal portable devices with the network 1000 resulted in a determination being made that the personal portable device 200 had the second-greatest extent of interaction with the network 1000, with the personal portable device 100 having had the greatest extent of interaction.

With such a line of succession of personal portable devices meant to occupy the center of the network 1000 already established, and with data indicating that line of succession already stored within each of these personal portable devices, a swift response to the removal of the personal portable device 100 that minimizes the disruption of the network 1000 is possible. As a result, even though FIG. 1e depicts a highly undesirable scenario, a swift and relatively graceful recovery leading to minimal disruption of functionality is achieved.

Figure 2:
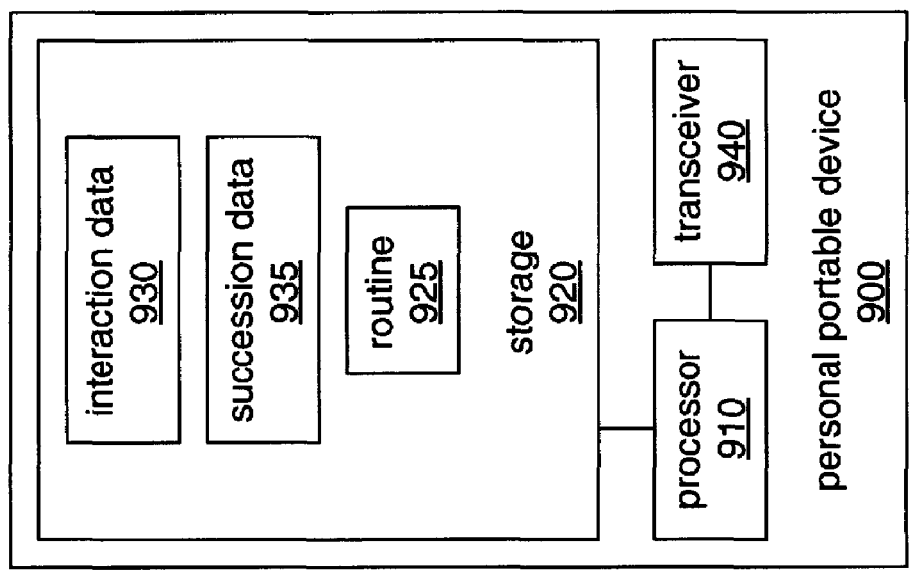
FIG. 2 is a block diagram of an internal architecture possibly employed by one or more of personal portable devices of FIGS. 1a through 1e.

FIG. 2 depicts a possible internal architecture of a personal portable device 900, the architecture being one that might be employed in one or more of the personal portable devices 100, 200, 300, 400 and 500 of FIGS. 1a through 1e. As will be explained, this depicted internal architecture is capable of supporting recurring comparisons of the extent of interaction of multiple personal portable devices with a network in support of changing positions of those personal portable devices within that network to increase resiliency in responding to changes made by a user to which personal portable devices are within that network. The personal portable device 900 incorporates a processor 910, a storage 920 and a transceiver 940. The processor 910 has access to the storage 920 to access various routines and data, and has access to the transceiver 940 to engage in wireless communications.

The storage 920 may be based on any of a wide variety of information storage technologies, including and not limited to, static RAM, dynamic RAM, ROM of either erasable or non-erasable form, FLASH, magnetic memory, ferromagnetic disk storage, phase-change storage or magneto-optical storage. The storage 920 is able to store varying quantities and types of routines and data to be accessed by the processor 910. The storage 920 stores at least a routine 925 and may store one or both of an interaction data 930 and a succession data 935. It is preferred that the storage 920 be at least partially based on some form of non-volatile storage technology to prevent the loss of at least some of its contents when deprived of power.

The processor 910 may be any of a variety of types of processing device, including and not limited to, a general purpose processor, a digital signal processor or other more specialized processor having a limited instruction set optimized for a given range of functions, a microcontroller or combinational logic. The processor 910 is able to access in the storage 920 the routine 925 to retrieve sequences of instructions that when executed by the processor 910, cause the processor 910 to perform various tasks, as will be described.

The transceiver 940 may employ any of a number of wireless communications technologies to enable wireless communications between the personal portable device 900 and other personal portable devices, depending on the technology employed in the network with which the personal portable device 900 interacts. Not unlike the network 1000 of FIGS. 1a through 1e, the technologies that may be employed by the transceiver 940 include and are not limited to infrared, ultrasound, skin conductance, and radio frequency (RF) signals. Where RF signals are employed, the frequencies of those signals and various aspects of the protocols and the transfers of commands and data may be selected to conform to any of a variety of wireless networking standards, including and not limited to, the Bluetooth specification and/or one of the variety of forms of the IEEE 802 series of standards.

Upon accessing the storage 920 to retrieve and execute the routine 925, the processor 910 is caused to monitor the extent to which the personal portable device 900 interacts with a network (not shown), possibly by monitoring the operation of the transceiver 940. In some embodiments, the extent to which the personal portable device 900 interacts with a network may be measured as the percentage of a given time period during which the personal portable device 900 is present within that network such that the personal portable device 900 is available to engage in exchanges of commands and/or data with other personal portable devices through that network. More particularly, this may be measured as the percentage of a given time period during which the transceiver 940 is receiving and/or actively responding to "heartbeat" signals or presence inquiry signals occurring at regular intervals on a network as part of a network protocol to continuously monitor what devices are present at any given time on that network. In other embodiments, the extent to which the personal portable device 900 interacts with a network may be measured as the percentage of a given time period during which the personal portable device 900 is engaged in exchanging commands and/or data with another personal portable device through that network. In still other embodiments, the extent to which the personal portable device 900 interacts with a network may be measured as the number of bits, bytes or other unit of measure of commands and/or data exchanged during a given time period between the personal portable device 900 and another personal portable device through that network. Although one or more of these and/or other similar measures of extent of interaction may be employed, in preferred practice, the extent of interaction is measured as the percentage of a given time period during which the personal portable device 900 is present within a network.

Regardless of the exact nature in which extent of interaction is measured, the processor 910 is further caused to store the measured extent of interaction of the personal portable device 900 with a network in the storage 920 as part of the interaction data 930. In addition to measuring and recording the extent of interaction of the personal portable device 900 with a network, the processor 910 is further caused to compare the extent of interaction of the personal portable device 900 to that of at least one other personal portable device of that same network on a recurring basis. In some embodiments, the processor 910 performs such comparisons between the extent of interaction of the personal portable device 900 and only the one or more other personal portable devices with which the personal portable device 900 directly shares a point-to-point link. In other embodiments, the processor 910 cooperates with a processor of at least one other personal portable device to perform such comparisons between the extent of interaction of the personal portable device 900 and the extent of interaction of one or more other personal portable devices.

In a star topology network, such as the network 1000 of FIGS. 1a through 1e, where the personal portable device 900 occupies an endpoint, a comparison of extents of interaction may be between the extent of interaction of the personal portable device 900 and only the extent of interaction of whichever personal portable device is at the center, presuming that the personal portable device 900 shares a point-to-point link with no other personal portable device than the one at the center. In such embodiments, the interaction data 930 may be made up only of data indicating the extent of interaction of the personal portable device 900, and corresponding data received from the personal portable device at the center indicating the extent of interaction of that personal portable device. Also, in such embodiments, if the result of such comparisons indicates that the extent of interaction of the personal portable device 900 with the network is greater than that of the personal portable device at the center, then the processor 910 is caused to cooperate with a processor of the personal portable device at the center to cause these two personal portable devices to swap positions in the network.

Alternatively, in a star topology network, such as the network 1000 of FIGS. 1*a* through 1*e*, where the personal portable device 900 occupies the center, a comparison of extents of interaction may be between the extent of interaction of the personal portable device 900 and the extents of interaction of all other personal portable devices in that network. In such embodiments, the interaction data 930 may be made up of data indicating the measured extent of interaction of every personal portable device within that network, including that of the personal portable device 900. Also, in such embodiments, if the result of such comparisons indicates that the extent of interaction of the personal portable device 900 with the network is less than that of a personal portable device occupying an endpoint, then the processor 910 is caused to cooperate with a processor of that personal portable device to cause these two personal portable devices to swap positions in the network.

In cooperating with a processor of another personal portable device to cause the personal portable device 900 to swap positions with that other device, the processor 910 may cooperate with that other processor to establish new point-to-point links for one or both of the personal portable device 900 and the other personal portable device that are consistent with the new positions that each personal portable device is to occupy, and to remove point-to-point links for one or both of these personal portable devices that are consistent only with the positions that each personal portable device will no longer be occupying. Alternatively and/or additionally, the processor 910 may cooperate with the processor of the other personal portable device to swap identities, at least to the extent that the processor 910 operates the transceiver 940 to present the personal portable device 900 on a network as if the personal portable device 900 were the other personal portable device, and the processor 910 cooperates with a processor of the other personal portable device to enable the other processor to operate a transceiver to present the other personal portable device on the same network as if it were the personal portable device 900. In performing this swap of identities, the processor 910 may store identity data of some form in the storage 920.

Where multiple personal portable devices in a network store data indicating an extent of interaction for a given personal portable device, there may arise a discrepancy between data indicating an extent of interaction stored as part of the interaction data 930 within the personal portable device 900 and corresponding data stored within another personal portable device. Such a discrepancy may occur as a result of the personal portable device 900 being removed from a network for a period of time such that at least a portion of the interaction data 930 is no longer up-to-date when the personal portable device 900 is brought back into that network. Where such a discrepancy is caused by the routine 925 to be detected by the processor 910, the processor 910 may be further caused to cooperate with a processor of at least one other personal portable device to resolve the discrepancy using any of a number of approaches. In some embodiments, data indicating a time and/or date at which at least a portion of the interaction data 930 was last updated may be compared with corresponding time and/or date data of another personal portable device to determine which personal portable device is more likely to have correct interaction data. In other embodiments, interaction data stored by the personal portable device occupying the center in a network having a star topology may be automatically deemed to be the correct data, and the personal portable device at the center may transmit at least a portion of its interaction data to one or more personal portable devices occupying endpoints to replace interaction data stored within those personal portable devices. In still other embodiments, at least a portion of the interaction data 930 may be averaged or otherwise mathematically combined with corresponding interaction data of another personal portable device to derive new interaction data to be stored in both personal portable devices.

In some embodiments, regardless of the exact nature in which extents of interaction with a network of personal portable devices on that network are measured or compared, the processor 910 is caused by the routine 925 (either in cooperation with one or more processors of other personal portable devices, or not) to employ results of comparisons of extents of interaction to create a line of succession of personal portable devices in order of decreasing extent of interaction with that network on a recurring basis, and to store data indicating that line of succession as the succession data 935. In a situation where the personal portable device 900 occupies an endpoint of the network having a star topology and the personal portable device at the center is removed from the network, the processor 910 is caused by the routine 925 to access the succession data 935 to determine what personal portable device is second in line from the personal portable device that was at the center (which was first in line) to attempt to form a new point-to-point link with. If one or more attempts to form that new point-to-point link prove unsuccessful, the processor 910 may be caused to again access the succession data 935 to determine what personal portable device is third in line to attempt to form a new point-to-point link with, and so on through the line of succession until a new point-to-point is successfully formed.

In embodiments in which data indicating a line of succession is stored, the interaction data 930 and the succession data 935 may be combined. Within such combined data, there may be a data structure in which data values indicating extents of interaction for multiple personal portable devices are stored. Elements of such a data structure may be organized in a manner inherently indicating the line of succession, or the processor 910 may be caused by the routine 925 to evaluate elements of such a data structure indicating extents of interaction to derive what personal portable device is next in the line of succession on an occasion when such information is needed.

Figure 3:
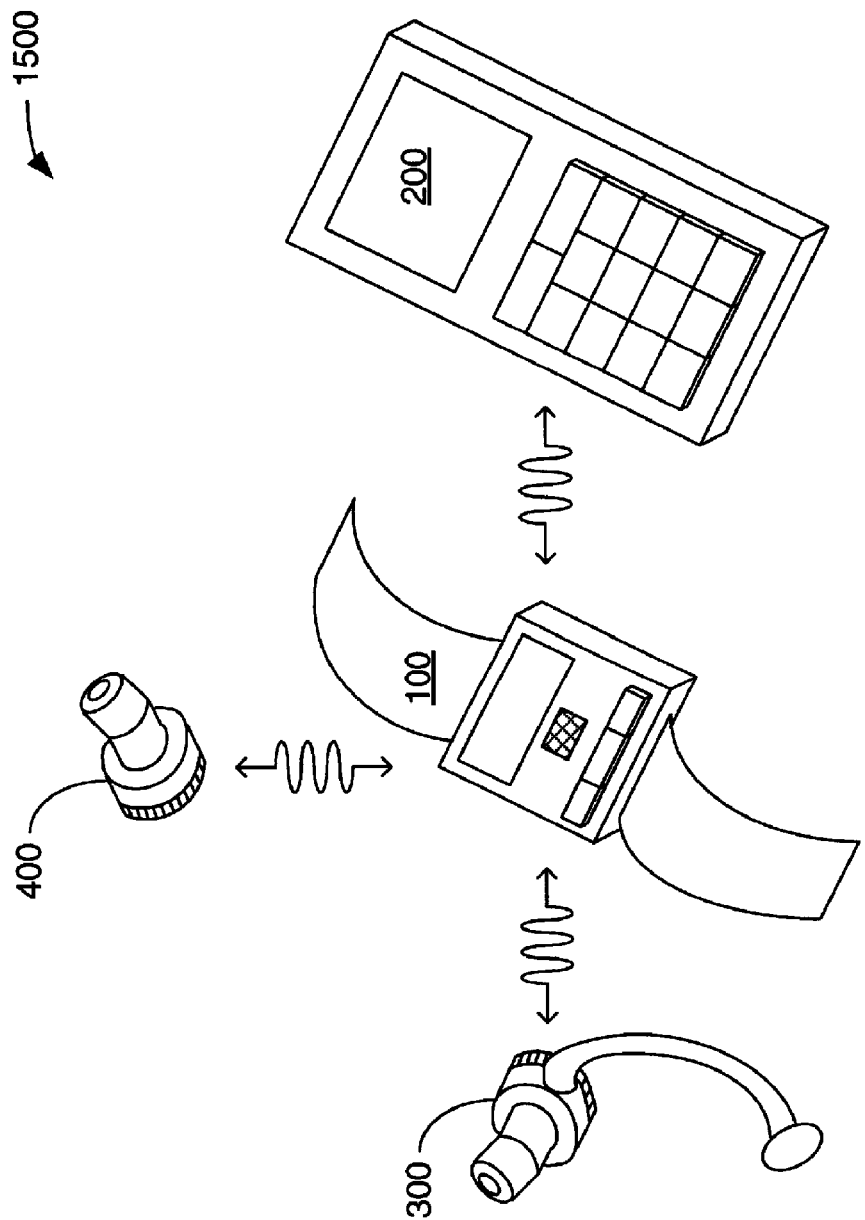
FIG. 3 depicts a specific example of a wireless network and personal portable devices not unlike those of FIGS. 1a through 1e.

FIG. 3 depicts an example of a wireless network 1500 incorporating multiple personal portable devices 100, 200, 300 and 400. Not unlike the network 1000 of FIGS. 1*a* through 1*e*, the network 1500 of FIG. 3 has a star topology with the personal portable device 100 at the center and the personal portable devices 200, 300 and 400 at endpoints. For sake of clarity of discussion, it is presumed that the depicted positions of the personal portable devices 100, 200, 300 and 400 in the star topology of the network 1500 have been arrived at over time as a result of recurring comparisons of relative extents of interaction of each of these personal portable devices with the network 1500, and as a result of movement of these personal portable devices between positions within the network 1500 in response to the results of those comparisons. It is further presumed that these recurring comparisons and movements of personal portable devices within the network 1500 have all been carried out in ways not unlike what has been previously described, especially with reference to the network 1000 of FIGS. 1*a* through 1*e*.

The network 1500 and the personal portable devices 100, 200, 300 and 400 depicted in FIG. 3 are being presented and discussed herein to provide a more specific example of aspects of the operation of a star topology network than was presented and discussed in a more general manner with regard to FIGS. 1a through 1e, and with regard to FIG. 2. In this more specific example, the personal portable devices 100, 200, 300 and 400 cooperate with each other through the network 1500 to enable their user to at least perform various functions involving the exchange of audio data, including voice communications (where voice sounds are represented as audio data) and/or audibly outputting recorded/received audio represented by the audio data. As might be surmised from viewing FIG. 3, the personal portable device 100 is meant to represent a wristwatch-like device capable of some degree of remote control over voice-based communications, such as displaying caller-ID, enabling remote manually-operated speed-dialing of stored telephone numbers, and/or enabling remote volume/muting control. As might also be surmised, the personal portable device 200 is meant to represent a cellular telephone (or other two-way communications device). As might be further surmised, the personal portable device 300 is meant to represent a wireless headset enabling monaural two-way audio communications in a hands-free manner. As might still further be surmised, the personal portable device 400 is meant to represent a wireless earphone enabling a user to listen to at least one audio channel of some form of audio, including recorded audio for entertainment, such as music, etc. The personal portable devices 300 and 400 may also be employed together to enable a user to listen to at least two different audio channels of some form of audio that are separately audibly output by each of the personal portable devices 300 and 400 (e.g., a left audio channel output by one of these two personal portable devices, and a right audio channel output by the other).

From the personal portable device 100 being depicted at the center of the network 1500, it can be surmised that the user of these personal portable devices tends to keep the personal portable device 100 within the network 1500 more often than any of the other personal portable devices 200, 300 or 400. This may simply be as a result of the user having a tendency to carry the personal portable device 100 on his/her person (along with at least one or more of the other personal portable devices) more frequently. Possibly, this results from the user most often wanting to be able to know the time by being able to look at a visual display of the personal portable device 300 more frequently than wanting to employ its ability to remotely control the two-way communications capabilities of either of the personal portable devices 200 and 300 (e.g., by possibly displaying caller-ID information, or by enabling remote dialing or volume control), and more frequently than wanting to employ the combination of the personal portable devices 200 and 400 in listening to recorded audio stored on the personal portable device 100 in stereo.

As has been previously discussed, the placement of a personal portable device at an endpoint as a result of it having a lesser extent of interaction with a network is advantageous since its subsequent removal from that network breaks only the single point-to-point link that connects it to the rest of that network, which causes comparatively less disruption to that network. Therefore, the placement of the personal portable devices 200, 300 and 400 at endpoints of the star topology of the network 1500 provides this advantage to the network 1500, thereby increasing its resiliency in responding to changes likely to be made by the user to which personal portable devices are within the network 1500 at any given time. In essence, the observed behavior of the user of these personal portable devices over time is employed as a basis for organizing the relative positions of these personal portable devices within the topology of the network 1500 to at least partially minimize the disruptions caused to the network 1500 by the more common behaviors of the user in changing which personal portable devices are within the network 1500.

However, and as also previously discussed, it is not possible to entirely eliminate instances of a personal portable device at the center position in the star topology of the network 1500 being removed due to any of a variety of possible circumstances, including loss of power by the personal portable device 100, interference with one or more of the point-to-point links making up the network 1500, or the user simply engaging in the comparatively less frequent behavior of removing the personal portable device 100 from the network 1500. By way of example, an occasion may arise where the user desires to carry the personal portable devices 200, 300 and 400 with him/her, but not the personal portable device 100. This may simply be because the user expects to engage in some form of activity in which the wearing of the watch-like personal portable device 100 on his/her wrist is not desired.

As a result of this action by the user, all of the point-to-point links making up the network 1500 are now lost, and the network 1500 must now be recreated with new point-to-point links and an alternate personal portable device occupying the center. In a manner not unlike what has been discussed with regard to the personal portable devices of the network 1000 of FIGS. 1a through 1e responding to a similar situation, the personal portable devices 200, 300 and 400 of the network 1500 respond to the loss of the personal portable device 100 by referring to succession data stored within each of the personal portable devices 200, 300 and 400 to determine what personal portable device is next in succession after the now missing personal portable device 100 based on extent of interaction with the network 1500. For sake of discussion of this example, it will be presumed that the personal portable device 200 has the second greatest extent of interaction with the network 1500, and therefore, is the next personal portable device in succession after the now missing personal portable device 100. The personal portable devices 300 and 400 then each engage in an effort to contact and establish a new point-to-point link with the personal portable device 200 to recreate the network 1500 with a star topology and with the personal portable device 200 at the center of that star topology. At substantially the same time, the personal portable device 200 engages in an effort to contact each of the personal portable devices 300 and 400 to also establish those same new point-to-point links. Due to each of the personal portable devices 200, 300 and 400 maintaining such succession data, each of these three personal portable devices were able to more quickly engage in a more coordinated effort to recreate the network 1500, thereby minimizing the amount of time during which operation of the network 1500 was disrupted.

Figure 4C:
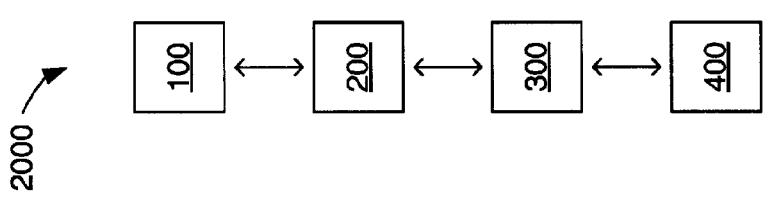
FIGS. 4a, 4b, 4c, 4d and 4e are block diagram depicting responses of personal portable devices in a wireless network having a chain topology to the addition and removal of different ones of those personal portable devices.
Figure 4B:
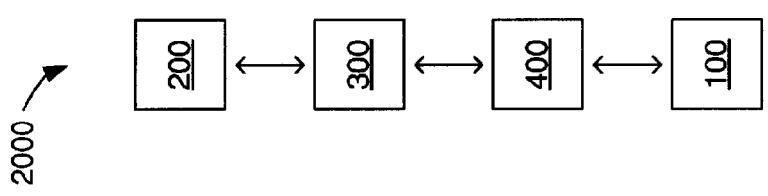
Figure 4A:
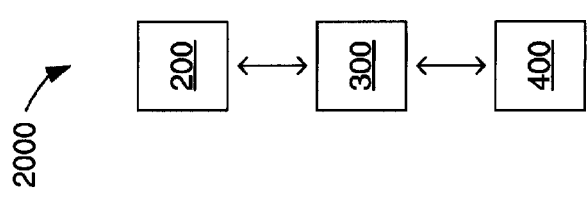
Figure 4E:
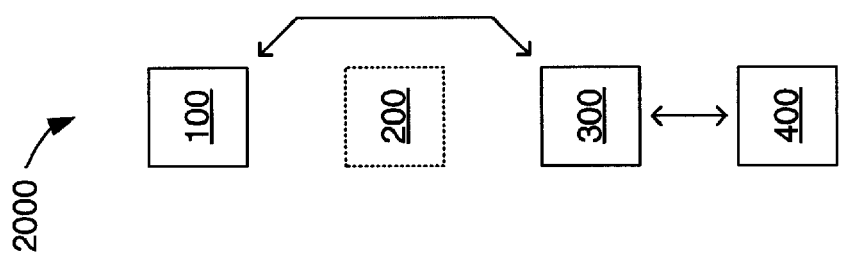
Figure 4D:
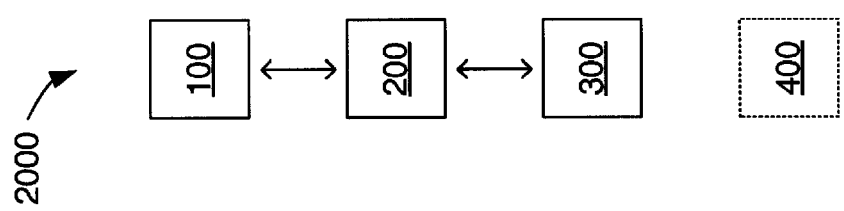

FIGS. 4a, 4b and 4c, taken together, depict the responses of personal portable devices already within a wireless network 2000 to the addition of another personal portable device to the network 2000. FIGS. 4d and 4e each depict the responses of personal portable devices remaining within the network 2000 to the removal of a personal portable device from the network 2000. More specifically, FIG. 4a depicts the network 2000 having a chain topology with personal portable devices 200 and 400 at the endpoints and a personal portable device 300 at a midpoint. FIG. 4b depicts the addition of a personal portable device 100 to the network 2000 of FIG. 4a at an endpoint. FIG. 4c depicts the movement of the personal portable device 100 from the endpoint it occupied in the chain topology of the network 2000 in FIG. 4b to the other endpoint in response to comparisons of the extent of the interactions of each of the personal portable devices with the network 2000. FIG. 4d depicts the manner in which such comparisons determine the response to the removal of the personal portable device 400 from an endpoint of the network 2000 of FIG. 4*c*. FIG. 4*e* depicts the manner in which such comparisons determine the response to the removal of the personal portable device 200 from a midpoint of the network 2000 of FIG. 4*c*.

The chain topology of the network 2000 is made up of point-to-point links, with whichever ones of the personal portable devices 100, 200, 300 and 400 that occupy an endpoint of the chain topology being linked to only one other personal portable device via a single point-to-point link, and with whichever ones of these personal portable devices that occupy a midpoint being linked to two other personal portable devices through separate ones of a pair of point-to-point links. As was the case with the network 1000 of FIGS. 1*a* through 1*e*, the network 2000 of FIGS. 4*a* through 4*e* may be based on any of a wide variety of wireless technologies. Also, as was the case with the personal portable devices 100, 200, 300, 400 and 500 of FIGS. 1*a* through 1*e*, the personal portable devices 100, 200, 300 and 400 of FIGS. 4*a* through 4*e* may be any of a variety of types personal portable device.

Turning to FIG. 4*a*, the network 2000 is already formed between the personal portable devices 200, 300 and 400. With the personal portable device 300 being the sole personal portable device at a midpoint between the endpoints occupied by each of the personal portable devices 200 and 400, each of the of personal portable devices 200 and 400 has as point-to-point link with the personal portable device 300. As a result, any communications between the personal portable devices 200 and 400 must necessarily be relayed through the personal portable device 300. As was the case with the point-to-point links making up the network 1000 of FIGS. 1*a* through 1*e*, the user of the personal portable devices 200, 300 and 400 of the network 2000 may have been required to engage in a procedure in which the user operated each of these personal portable devices to prepare them to form point-to-point links therebetween in order to form the network 2000. Further, such a procedure may have entailed the exchange of codes uniquely identifying each of these personal portable devices and/or encryption keys among these personal portable devices.

As was the case with the network 1000, in the network 2000, the allocation of relative positions of the personal portable devices 200, 300 and 400 is dynamic, and therefore, FIG. 4*a* depicts only one possible allocation of those relative positions. More specifically, the personal portable devices 200, 300 and 400 cooperate to automatically alter the point-to-point links between them to change their relative positions within the network 2000 in response to recurring comparisons of the extent of the interactions that each of these personal portable devices has with the network 2000. Not unlike the network 1000, in the network 2000, these comparisons entail comparing one or more factors concerning the interaction of each of these personal portable devices with the network 2000. However, unlike the network 1000 where such comparisons were employed to determine which personal portable device should be positioned at the center of the star topology of the network 1000, in the network 2000, the results of such comparisons are employed to determine the relative extents of each personal portable device with the network 2000 in order to position the personal portable devices in order of relative extent of interaction from one endpoint of the chain topology to the other. In other words, the personal portable device determined to have the greatest extent of interaction with the network 2000 is positioned at one endpoint, the personal portable device determined to have the lowest extent of interaction with the network 2000 is positioned at the other endpoint, and the remaining personal portable devices are positioned at midpoint positions in descending order of extent of interaction from the personal portable device at the endpoint having the greatest extent to the personal portable device at the other endpoint having the lowest extent. As will be explained in greater detail, this ordering of personal portable devices along the chain topology of the network 2000 is done to enhance the stability of the topology of the network 2000. For sake of discussion, it will be presumed that the personal portable device 200 has had the greatest extent of interaction with the network 2000 (thereby causing it to be positioned at one endpoint), and that the personal portable device 400 has had the lowest extent of interaction (thereby causing it to be positioned at the other endpoint).

The intention of such ordering based on extent of interaction with the network 2000 is to at least minimize the number of occasions where the chain topology of the network 2000 is split into two portions due to the removal of a personal portable device at a midpoint. As those skilled in the art will readily recognize, the loss of a personal portable device at a midpoint of a chain topology network disrupts all communication between the remaining personal portable devices that are on opposite sides of the midpoint that the lost personal portable device once occupied, as well as any function requiring continuing communication between personal portable devices on opposite sides of that midpoint. Such a function will remain disrupted until the network is recreated through the reconnection of the two split portions as a result of a personal portable device of one of the two split portions forming a new point-to-point link with a personal portable device of the other of the two split portions. However, such an effort to recreate the network can take time as at least one personal portable device in each of the split portions engage in separate and uncoordinated efforts to locate each other, establish a new point-to-point link, and communicate through that new point-to-point link to reconnect the split portions. Aside from the disruption in functionality for whatever amount of time may be required to reconnect the two split portions, there is also the possibility that the new point-to-point link may fail to be formed between the two split portions as a result of interference between the separate and uncoordinated efforts by personal portable devices of each portion to locate a personal portable device of the other portion. Further, and depending on the protocols used in establishing the new point-to-point link, there is the possibility of an unwanted additional device somehow being allowed to form a point-to-point link with one of the personal portable devices during such a reconnection effort and eventually becoming included in the recreated network such that network security is compromised.

In contrast to the removal of a personal portable device occupying a midpoint of a chain topology network, the removal of a personal portable device occupying an endpoint disrupts only the point-to-point link between that removed personal portable device and the personal portable device at a midpoint with which the removed personal portable device shared a point-to-point link. As a result, there is no need to recreate a network that has been split, and functions entailing cooperation between the remaining multiple personal portable devices are able to continue without disruption. Clearly, this sort of comparably minimal effect on a chain network is greatly preferable.

Turning to FIG. 4*b*, regardless of the manner in which the network 2000 with the configuration depicted in FIG. 4*a* was formed, the user of the personal portable devices 200, 300 and 400 causes the network 2000 to be altered by adding the personal portable device 100. For sake of discussion, it will be presumed that the personal portable device 100 has not previously interacted with the network 2000, and therefore, as depicted in FIG. 4b, the personal portable device 100 is at least initially caused to occupy the endpoint of the network 2000 meant to be occupied by the personal portable device having the lowest extent of interaction with the network 2000. The personal portable device 400, which occupied the endpoint meant for the personal portable device with the lowest extent of interaction in FIG. 4a, now occupies the midpoint adjacent to that endpoint. In some embodiments, an initial placement of the personal portable device 100 at the endpoint meant to be occupied by the personal portable device having the lowest extent of interaction may be a default automatic response to the addition of any entirely new personal portable device to the network 2000. This may be based on an assumption that the user may occasionally add a personal portable device to the network 2000 on only a temporary basis, and therefore, it may not be desirable to allow the order of positions of the personal portable devices within the network 2000 to be changed in response to the addition of a personal portable device that the user may not intend to keep within the network 2000 for very long. In other embodiments, such an initial placement may automatically arise from the results of the comparisons of the extent of interactions that each personal portable device has with the network 2000. Since the personal portable device 100 has not previously interacted with the network 2000, at all, its extent of interaction with the network 2000 would very likely be less than that of all of the other personal portable devices within the network 2000, and the placement of the personal portable device 100 at the endpoint meant to be occupied by the personal portable device with the lowest extent of interaction would be the expected result.

Turning to FIG. 4c, regardless of the manner or mechanism by which the personal portable device 100 is given the endpoint meant to be occupied by the personal portable device with the lowest extent of interaction upon being added to the network 2000, the passage of time and the occurrence of comparisons of the extent of interactions of each of the personal portable devices 100, 200, 300 and 400 with the network 2000 as the user has made use of these personal portable devices has subsequently resulted in the relative positions of these personal portable devices being changed. More specifically, the personal portable device 100 has moved to the endpoint position meant to be occupied by the personal portable device with the greatest extent of interaction with the network 2000 as a result of the personal portable device 100 being determined in recurring comparisons to have more extensive interactions with the network 2000 than any of the other personal portable devices.

In some embodiments, the personal portable device 100 may change positions within the topology of the network 2000 directly from the endpoint meant to be occupied by the personal portable device having the lowest extent of interaction with the network 2000, to the endpoint meant to be occupied by the personal portable device having the greatest extent. In such embodiments, the personal portable devices 100, 200 and 400 may cooperate to alter the point-to-point links of the network 2000 by cooperating to establish a new point-to-point link between the personal portable devices 100 and 200, and cooperating to remove the point-to-point link between the personal portable devices 100 and 400. In other embodiments, the personal portable device 100 may make such a change in positions in the network 2000 by moving in an incremental or stepped manner along the chain topology of the network 2000. In such embodiments, the personal portable device 100 initially swaps positions with the personal portable device 400 such that the personal portable device 400 then occupies the endpoint position just occupied by the personal portable device 100, and vice versa. The personal portable device 100 then swaps positions with the personal portable device 300, and then the personal portable device swaps positions with the personal portable device 200 such that the personal portable device 100 now occupies the endpoint meant to be occupied by the personal portable device having the greatest extent of interaction with the network 2000. In performing each of these incremental or stepped swaps of position, the personal portable device 100 may cooperate with whatever personal portable device it swaps positions with in each such swap to alter the point-to-point links of the network 2000 by cooperating to establish new point-to-point links consistent with the new positions that each of the two personal portable devices is about to occupy, and cooperating to remove the point-to-point links that are not consistent with those new positions. Alternatively, the personal portable device 100 may cooperate with whatever personal portable device it swaps positions with to swap their identities on the network 2000 such that the personal portable device 100 now presents itself to other personal portable devices in the network 2000 as if it were the personal portable device it just swapped positions with, and vice versa.

Turning to FIG. 4d, the user subsequently removes the personal portable device 400 from the network 2000 whilst having the configuration of point-to-point links depicted in FIG. 4c. For the sake of discussion, it is presumed that the personal portable device 400 remained at the endpoint position meant to be occupied by the personal portable device with the lowest extent of interaction with the network 2000 since the movement of the personal portable device 100 to the endpoint position meant to be occupied by the personal portable device having the greatest extent of interaction depicted in FIG. 4c. As a result of the personal portable device 400 being at an endpoint position within the network 2000 at the time of its removal from the network 2000, only the point-to-point link between the personal portable devices 300 and 400 is lost, while the rest of the network 2000 is unaffected. In other words, FIG. 4d depicts the desired results of the aforedescribed automatic movement of personal portable devices between positions in the network 2000 in response to recurring comparisons of extents of interaction between each of the personal portable devices 100, 200, 300 and 400 with the network 1000. Functions requiring cooperation between the remaining personal portable devices 100, 200 and 300 remain uninterrupted, and any need to engage in reconnecting split portions of the network 2000 in order to recreate the network 2000 is precluded. Further, if at some later time the user once again brings the personal portable device 400 back within the network 2000, it is likely the that personal portable device 400 would once again be given the endpoint position meant to be occupied by the personal portable device with the lowest extent of interaction, since its removal from the network 2000 would likely result in the personal portable device 400 continuing to have interacted with the network 2000 to a lesser extent than any of the other personal portable devices within the network 2000.

Turning to FIG. 4e, in contrast to what was depicted in FIG. 4d, the user removes the personal portable device 200 whilst the network 2000 has the configuration of point-to-point links depicted in FIG. 4c. For the sake of discussion, it is presumed that the personal portable device 200 was caused to occupy the midpoint position depicted in FIG. 4c as a result of having an extent of interaction with the network 2000 less than that of the personal portable device 100, but more than that of either of the personal portable devices 300 and 400. Unfortunately, the removal of the personal portable device 100 from a midpoint of the network 2000 has the undesirable result of splitting the network 2000 into a portion made up of the personal portable device 100 and another portion made up of the personal portable devices 300 and 400. In other words, FIG. 4e depicts an occurrence that was sought to be avoided through the aforedescribed automatic movement of personal portable devices between positions in the network 2000 in response to recurring comparisons of extents of interaction between each of the personal portable devices 100, 200, 300 and 400 with the network 2000. As those familiar with wireless networks having a chain topology and based on any technology will readily recognize, it is not possible to entirely avoid instances of a device occupying a midpoint of such a network being removed from that network, ceasing to function, or in some way having its wireless communications with other devices on that network being lost or interfered with.

However, to avoid the kind of previously described undesirable outcome of an uncoordinated effort by the remaining personal portable devices 100, 300 and 400 to reconnect the split portions of the network 2000, in some embodiments, the same ordering of positions within the chain topology of the network 2000 is further employed to dictate what the order of positions within the chain topology of the network 2000 should become following the loss of the personal portable device 200 from its midpoint position. To put it another way, each of the personal portable devices 100 and 300 act to establish a new point-to-point link between them to thereby maintain the same ordering of positions within the resulting recreated network 2000, only without the personal portable device 200 between them. Preferably, each of the personal portable devices 100, 200, 300 and 400 stores data indicating this ordering of positions such that it is possible for any of the personal portable devices 100, 200, 300 and 400 to immediately act to maintain the ordering of positions whatever personal portable devices remain upon detecting the removal of one of the personal portable devices from the network 2000. Indeed, FIG. 4e depicts the establishment of new point-to-point links between the personal portable devices 100 and 300 in response to the removal of the personal portable device 200.

With such an ordering of personal portable devices within the network 2000 already established, and with data indicating the ordering of positions already stored within each of these personal portable devices, a swift response to the removal of the personal portable device 200 that minimizes the disruption of the network 2000 is possible. As a result, even though FIG. 4e depicts a highly undesirable scenario, a swift and relatively graceful recovery leading to minimal disruption of functionality in a minimal amount of time is achieved.

Figure 5:
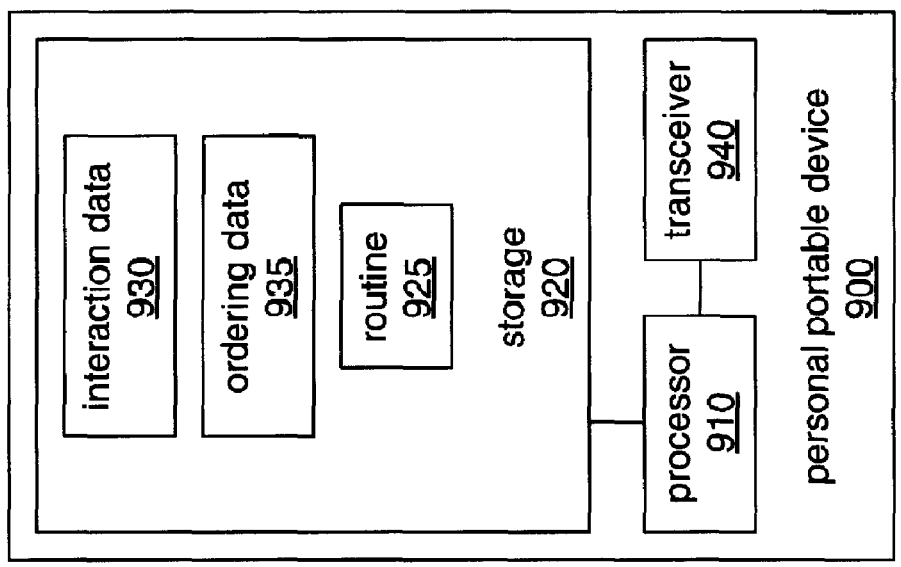
FIG. 5 is a block diagram of an internal architecture possibly employed by one or more of personal portable devices of FIGS. 4a through 4e.

FIG. 4 depicts a possible internal architecture of a personal portable device 900, the architecture being one that might be employed in one or more of the personal portable devices 100, 200, 300 and 400 of FIGS. 4a through 4e. A comparison of this internal architecture and the internal architecture depicted in FIG. 2 reveals numerous similarities, and for this reason, identical or at least substantially similar items have been identically numbered. Not unlike the internal architecture of FIG. 2, the internal architecture of FIG. 5 is capable of supporting recurring comparisons of the extent of interaction of multiple personal portable devices within a network in support of changing positions of those personal portable devices within that network to increase resiliency in responding to changes made by a user to which personal portable devices are within that network. Also not unlike the internal architecture depicted in FIG. 2, in the internal architecture of FIG. 5, the personal portable device 900 incorporates a processor 910, a storage 920 and a transceiver 940. The processor 910 has access to the storage 920 to access various routines and data, and has access to the transceiver 940 to engage in wireless communications. Again, the processor 910, the storage 920 and the transceiver 940 may each be based on any of a variety of technologies.

Further not unlike the personal portable device 900 of FIG. 2, the processor 910 of the personal portable device 900 of FIG. 5 is caused to monitor the extent to which the personal portable device 900 interacts with a network (not shown), possibly by monitoring the operation of the transceiver 940. Again, although extent of interaction may be measured in any of a variety of ways, in preferred practice, the extent of interaction is measured as the percentage of a given time period during which the personal portable device 900 is present within a network.

In executing a sequence of instructions of the routine 925, the processor 910 is caused to store the measured extent of interaction of the personal portable device 900 with a chain topology network in the storage 920 as part of the interaction data 930, and is caused to store at least the current position of the personal portable device 900 within the chain topology of that network as part of the ordering data 935. The processor 910 is further caused to compare the extent of interaction of the personal portable device 900 to that of at least one other personal portable device of that same network on a recurring basis. In some embodiments, the processor 910 performs such comparisons between the extent of interaction of the personal portable device 900 and only the one or more other personal portable devices with which the personal portable device 900 is directly connected through a point-to-point link. In other embodiments, the processor 910 cooperates with a processor of at least one other personal portable device to perform such comparisons between the extent of interaction of the personal portable device 900 and the extents of interaction of one or more other personal portable devices.

In a chain topology network, such as the network 2000 of FIGS. 4a through 4e, where the personal portable device 900 occupies an endpoint, a comparison of extents of interaction may be between the extent of interaction of the personal portable device 900 and only the extent of interaction of whichever personal portable device occupies the midpoint position that is adjacent to the endpoint occupied by the personal portable device 900. In such embodiments, the interaction data 930 may be made up only of data indicating the extent of interaction of the personal portable device 900, and corresponding data received from the personal portable device at that adjacent midpoint. In such embodiments and where the personal portable device 900 occupies the endpoint meant to be occupied by the personal portable device having the greatest extent of interaction with the network, if the result of such comparisons indicates that the extent of interaction of the personal portable device 900 with the network is less than that of the personal portable device at that adjacent midpoint, the processor 910 is caused to cooperate with a processor of the personal portable device at that adjacent midpoint to cause these two personal portable devices to swap positions in the network. Similarly, in such embodiments and where the personal portable device 900 occupies the endpoint meant to be occupied by the personal portable device having the lowest extent of interaction with the network, if the result of such comparisons indicates that the extent of interaction of the personal portable device 900 with the network is greater than that of the personal portable device at that adjacent midpoint, the processor 910 is caused to cooperate with a processor of the personal portable device at that adjacent midpoint to cause these two personal portable devices to swap positions in the network.

Similarly, in a chain topology network where the personal portable device 900 occupies a midpoint position, a comparison of extents of interaction may be between the extent of interaction of the personal portable device 900 and only the extents of interaction of each of the two personal portable devices that are each directly connected to the personal portable device 900 with a point-to-point link (i.e., each of the two personal portable devices immediately adjacent to the personal portable device 900 in the chain). In such embodiments, the interaction data 930 may be made up only of data indicating the extent of interaction of the personal portable device 900 and corresponding data received from each of those two immediately adjacent personal portable devices. In such embodiments, if the result of such comparisons indicates that the extent of interaction of the personal portable device 900 with the network is less than that of the immediately adjacent personal portable device occupying a position meant to be occupied by a personal portable device having a lesser extent of interaction than the position currently occupied by the personal portable device 900, the processor 910 is caused to cooperate with a processor of the personal portable device at that adjacent position to cause these two personal portable devices to swap positions in the network. Similarly, in such embodiments, if the result of such comparisons indicates that the extent of interaction of the personal portable device 900 with the network is greater than that of the immediately adjacent personal portable device occupying a position meant to be occupied by a personal portable device having a greater extent of interaction than the position currently occupied by the personal portable device 900, the processor 910 is caused to cooperate with a processor of the personal portable device at that adjacent position to cause these two personal portable devices to swap positions in the network.

Alternatively, in a chain topology network such as the network 2000 of FIGS. 4a through 4e, the personal portable device 900 may receive results of comparisons of extents of interaction of the personal portable device 900 versus extents of interaction of multiple other personal portable devices on a network, or the processor 910 may be caused to at least participate in such comparisons of extents of interaction. Either way, the interaction data 930 may be made up of data indicating extents of interaction for multiple personal portable devices, including that of the personal portable device 900. In such embodiments, where the results of such comparisons indicate that the personal portable device 900 currently occupies a position in the chain topology of a network, and that position that does not correctly correspond to the position it should occupy in view of its relative extent of interaction with the network, the processor 910 may be caused to cooperate with the processor of at least one other personal portable to cause the position of the personal portable device 900 within the chain topology to be changed. This may be accomplished through the processor 910 cooperating with a processor of at least one other personal portable device to cause the personal portable device 900 and that other personal portable device to swap positions. Alternatively, this may be accomplished through the processor 910 cooperating with processors of multiple other personal portable devices to cause a series of swaps of positions between the personal portable device 900 and each one of those multiple other personal portable devices to move the personal portable device along the chain topology, one position at a time.

In cooperating with a processor of another personal portable device to cause the personal portable device 900 to swap positions with that other device, the processor 910 may cooperate with that other processor to establish new point-to-point links for one or both of the personal portable device 900 and the other personal portable device that are consistent with the new positions that each personal portable device is to occupy, and to remove point-to-point links for one or both of these personal portable devices that are consistent only with the positions that each personal portable device will no longer be occupying. Alternatively and/or additionally, the processor 910 may cooperate with the processor of the other personal portable device to swap identities, at least to the extent that the processor 910 operates the transceiver 940 to present the personal portable device 900 on a network as if the personal portable device 900 were the other personal portable device, and the processor 910 cooperates with a processor of the other personal portable device to enable the other processor to operate a transceiver to present the other personal portable device on the same network as if it were the personal portable device 900. In performing this swap of identities, the processor 910 may store identity data of some form in the storage 920.

Although the interaction data 930 and the ordering data 935 have been discussed as being separate pieces of data, those skilled in the art will readily recognize that they may be combined in some embodiments. Within such combined data, there may be a data structure in which data values indicating extents of interaction for multiple personal portable devices are stored. Elements of such a data structure that each correspond to a personal portable device may be organized in a manner inherently indicating the ordering of personal portable devices along the chain topology of network, or the processor 910 may be caused by the routine 925 to evaluate elements of such a data structure indicating extents of interaction to determine what position the personal portable device 900 should occupy versus what position the personal portable device currently occupies in a network.

In a manner not unlike what has been previously discussed, discrepancies that may arise in data stored within two different personal portable devices indicating different extents of interaction and/or different positions along a chain topology for one or more personal portable devices may be addressed in any of a number of ways. One of more than one conflicting pieces of data may be selected as being most likely to be correct based on the relative positions of the personal portable devices in which conflicting data is stored, or based on a comparison of the time and/or date on which each piece of conflicting data was most recently updated. Alternatively, a mathematical approach to deriving new data from conflicting data may be employed.

In some embodiments, regardless of the exact nature in which extents of interaction with a network of personal portable devices within that network are measured or compared, data indicating an ordering of personal portable devices along the chain of a chain topology network resulting from those comparisons may be employed in recreating that network in response to it being split into multiple portions. In a situation where the personal portable device 900 is adjacent to a personal portable device occupying a midpoint position, and that adjacent personal portable device is removed, the processor 910 is caused to access the ordering data 935 to determine the identity of the other personal portable device that was also adjacent to the just-removed personal portable device, and is then further caused to attempt to form a point-to-point link directly with that personal portable device, since the personal portable device that was originally between them has been removed. If one or more attempts at forming a this new point-to-point link should fail, then the processor 910 is caused to access the ordering data 935, again, to identify the personal portable device that occupied the position that was at the next position after the personal portable device with which efforts to form a new point-to-point link has failed, and so on, until a point-to-point link is successfully established with a personal portable device that was at a position on the other side of the one that was removed. However, in a situation where the personal portable device 900 is adjacent to a personal portable device occupying an endpoint position, and that adjacent personal portable device is removed, the processor 910 is not caused to form a new point-to-point link with another personal portable device, because the personal portable device 900 is now occupying an endpoint position as a result of the removal of that adjacent personal portable device.

Figure 6:
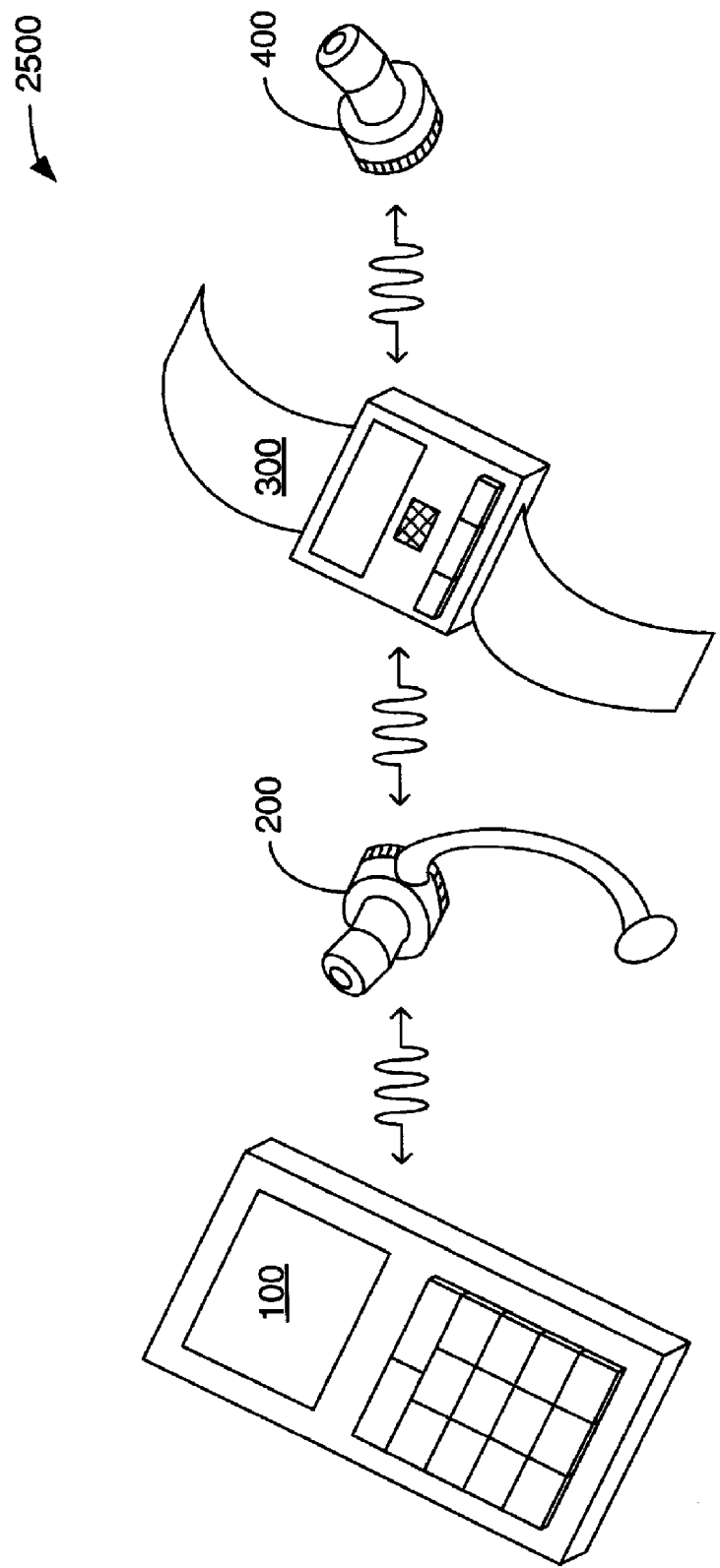
FIG. 6 depicts a specific example of a wireless network and personal portable devices not unlike those of FIGS. 4a through 4e.

FIG. 6 depicts an example of a wireless network 2500 incorporating multiple personal portable devices 100, 200, 300 and 400. Not unlike the network 2000 of FIGS. 4a through 4e, the network 2500 of FIG. 6 has a chain topology with the personal portable devices 100 and 400 at the endpoints and the personal portable devices 200 and 300 at the midpoints therebetween. For sake of clarity of discussion, it is presumed that the ordering of the personal portable devices 100, 200, 300 and 400 at the depicted positions in the chain topology of the network 2500 has been arrived at over time as a result of recurring comparisons of relative extents of interaction of each of these personal portable devices with the network 2500, and as a result of movement of these personal portable devices between positions within the network 2500 in response to the results of those comparisons. It is further presumed that these recurring comparisons and movements of personal portable devices within the network 2500 have all been carried out in ways not unlike what has been previously described, especially with reference to the network 2000 of FIGS. 4a through 4e. It is still further presumed that from the pattern of usage of these personal portable devices by their user over time, the personal portable device 100 occupies the endpoint position meant to be occupied by the personal portable device determined to have the greatest extent of interaction with the network 2500, and the other personal portable devices 200, 300 and 400 occupy the remaining chain topology positions in an order of decreasing extents of interaction with the network 2500 ending with the personal portable device 400 occupying the endpoint position meant to be occupied by the personal portable device having the lowest extent of interaction with the network 2500.

Like the presentation and discussion of the network 1500 and the personal portable devices 100, 200, 300 and 400 of FIG. 3, earlier, the network 2500 and the personal portable devices 100, 200, 300 and 400 depicted in FIG. 6 are being presented and discussed herein to provide a more specific example of aspects of the operation of a chain topology network than was presented and discussed in a more general manner with regard to FIGS. 4a through 4e. In this more specific example, the personal portable devices 100, 200, 300 and 400 cooperate with each other through the network 2500 to enable their user to at least perform various functions involving voice communications and other forms of audio. As might be surmised from viewing FIG. 6, the personal portable device 100 is meant to represent a cellular telephone (or other two-way communications device). As might also be surmised, the personal portable device 200 is meant to represent a wireless headset enabling monaural two-way audio communications in a hands-free manner. As might be further surmised, the personal portable device 300 is meant to represent a wristwatch-like device capable of some degree of remote control over voice-based communications, such as displaying caller-ID, enabling remote manually-operated speed-dialing of stored telephone numbers, and/or enabling remote volume/muting control. As might still further be surmised, the personal portable device 400 is meant to represent a wireless earphone enabling a user to listen to at least one audio channel of some form of audio, including recorded audio for entertainment, such as music, etc. The personal portable devices 200 and 400 may also be employed together to enable a user to listen to at least two different audio channels of some form of audio that are separately audibly output by each of the personal portable devices 200 and 400 (e.g., a left audio channel output by one of these two personal portable devices, and a right audio channel output by the other).

From the ordering of the personal portable devices along the chain topology of the network 2500, it can be surmised that the user of these personal portable devices tends to keep the personal portable device 100 within the network 2500 more often than any of the personal portable devices 200, 300 and 400. This may simply be as a result of the user having a tendency to carry the personal portable device 100 on his/her person (along with at least one or more of the other personal portable devices). Possibly, this results from usage of the personal portable device 100 with the personal portable device 200 and/or 300 for two-way communications on some occasions, and usage of the personal portable device 100 with both of the personal portable devices 200 and 400 to listen to audio recordings stored on the personal portable device 100 in stereo on other occasions, but not so much usage of the personal portable device 100 with the combination of all three of the other personal portable devices. In other words, the user may have a tendency to carry different combinations of these personal portable devices with him/her at different times in anticipation of performing different functions, and it happens that these combinations include the personal portable device 100 more frequently than any of the personal portable devices 200, 300 or 400.

As has been previously discussed, the placement of a personal portable device at an endpoint as a result of it having a lesser extent of interaction with a network is advantageous since its removal from the network breaks only the single point-to-point link that ties it to the rest of that network which causes comparatively less disruption to that network. Therefore, the placement of the personal portable device 400 at the endpoint position meant to be occupied by the personal portable device having the lowest extent of interaction with the network 2500 provides this advantage to the network 2500, thereby increasing its resiliency in responding to changes likely to be made by the user to which personal portable devices are within the network 2500. In essence, the observed behavior of the user of these personal portable devices over time has been employed as a basis for organizing the relative positions of these personal portable devices within the topology of the network 2500 to at least partially minimize the disruptions caused to the network 2500 by the more common behaviors of the user in changing which personal portable devices are within the network 2500.

However, and as also previously discussed, it is not possible to entirely eliminate instances of a personal portable device at a midpoint along the topology of the network 2500 being removed due to loss of power by one of those personal portable devices, interference with one or more of the point-to-point links, or the user simply engaging in the less frequent behavior of removing one of those personal portable devices from the network 2500. By way of example, an occasion may arise where the user desires to carry the personal portable devices 100, 200 and 400 with him/her, but not the personal portable device 300. This may simply be because the user expects to listen to music stored on the personal portable device 100 through both of the personal portable devices 200 and 400, but does not expect to be engaged in two-way voice communications, and so does not desire to wear the personal portable device 300 to view caller-ID information or to dial phone numbers. As a result of this action by the user, the network 2500 has now be split into one portion made up of the personal portable devices 100 and 200, and another portion made up solely of the personal portable device 400. In a manner not unlike what has been discussed with regard to the personal portable devices of the network 2000 of FIGS. 4*a* through 4*e* responding to a similar situation, the personal portable devices 200 and 400 of the network 2500 respond to the loss of the personal portable device 300 by referring to ordering data stored within each of the personal portable devices 200 and 400 to determine what other personal portable device had a point-to-point link with the now missing personal portable device 300. In so doing, the personal portable device 200 determines that the personal portable device 300 had a point-to-point link with the personal portable device 400, and the personal portable device 400 determines that the personal portable device 300 had a point-to-point link with the personal portable device 200. The personal portable devices 200 and 400 then each engage in an effort to contact and establish a new point-to-point link with each other in order to reconnect the two split portions of the network 2500. Due to each of the personal portable devices 200 and 400 maintaining such ordering data, each of these two personal portable devices were able to more quickly engage in a more coordinated effort to reconnect the two split portions of the network 2500, thereby minimizing the amount of time during which this split existed.

Other embodiments are within the scope of the following claims.

What is claimed is:

1. A first personal portable device to interact with a wireless network having a topology having a first point-to-point link to directly connect the first personal portable device to a second personal portable device, the first personal portable device comprising:
 a first processor;
 a first wireless transceiver operable by the first processor to enable communications across the wireless network with the second personal portable device;
 a first storage accessible to the first processor in which is stored a first routine comprising a sequence of instructions, that when executed by the first processor, causes the first processor to:
  store within the first personal portable device an indication of a first extent of interaction of the first personal portable device with the wireless network;
  receive through the first wireless transceiver an indication of a second extent of interaction of the second personal portable device with the wireless network;
  compare the first and second extents of interaction on a recurring basis; and
  cooperate with at least one processor of at least one other personal portable device within the wireless network to move the first personal portable device from occupying one position within the topology of the wireless network to occupying a different position within the topology of the network in response to a result of a comparison between the first and second extents of interaction; and wherein the first and second extents of interaction are measured as one of a group consisting of:
  relative portions of a time period during which each of the first and second personal portable devices are within the wireless network such that each of the first and second personal portable devices are each accessible to at least one other personal portable device through the network; and
  relative portions of a time period during which each of the first and second personal portable devices exchange data with at least one other personal portable device through the network.

2. The first personal portable device of claim 1, wherein the first processor is further caused to cooperate with a second processor of the second personal portable device in comparing the first and second extents of interaction.

3. The first personal portable device of claim 1, wherein:
 the topology of the wireless network comprises a star topology having a center position and an endpoint position; and
 the cooperation of the first processor with at least one processor of at least one other personal portable device within the wireless network to move the first personal portable device from occupying the one position to occupying the different position comprises the first processor being further caused to cooperate with a second processor of the second personal portable device to cause the first and second personal portable devices to exchange occupying the center and endpoint positions.

4. The first personal portable device of claim 3, wherein the first processor is caused to cooperate with the second processor to move the first personal portable device from the endpoint position to the center position in response to a result of comparing the first and second extents of interaction being that the first extent of interaction is greater than the second extent of interaction.

5. The first personal portable device of claim 1, wherein:
 the topology of the wireless network comprises a chain topology having an endpoint position and a midpoint position; and
 the cooperation of the first processor with at least one processor of at least one other personal portable device within the wireless network to move the first personal portable device from occupying the one position to occupying the different position comprises the first processor being further caused to cooperate with a second processor of the second personal portable device to cause the first and second personal portable devices to exchange occupying the endpoint and midpoint positions.

6. The first personal portable device of claim 5, wherein:
 the endpoint position is to be occupied by a personal portable device of the wireless network having the greatest extent of interaction with the network; and
 the first processor is caused to cooperate with the second processor to move the first personal portable device from the midpoint position to the endpoint position in response to a result of comparing the first and second extents of interaction being that the first extent of interaction is greater than the second extent of interaction.

7. The first personal portable device of claim 1, wherein the cooperation of the first processor with at least one processor of at least one other personal portable device within the wireless network to move the first personal portable device from occupying the one position to occupying the different position comprises the first processor being further caused to cooperate with a second processor of the second personal portable device to establish a second point-to-point link consistent with the first personal portable device occupying the different position and to remove a third point-to-point link that is not consistent with the first personal portable device occupying the different position.

8. The first personal portable device of claim 1, wherein the cooperation of the first processor with at least one processor of at least one other personal portable device within the wireless network to move the first personal portable device from occupying the one position to occupying the different position comprises the first processor being further caused to cooperate with a second processor of the second personal portable device to cause the first and second personal portable devices to exchange identities such that the first processor causes the first personal portable device to be presented on the wireless network as the second personal portable device and the second processor causes the second personal potable device to be presented on the wireless network as the first personal portable device.

9. The first personal portable device of claim 1, wherein the first processor is further caused to store data within the first personal portable device indicating an identity of a third personal portable device that the first processor will attempt to establish a new point-to-point link with in response to a future removal of the second personal portable device from a position in between the first and third personal portable devices in the topology of the wireless network, wherein the first processor is caused to store the data indicating the identity of the third personal portable device at an initial time where the first personal portable device is still directly connected to the second personal portable device through the first point-to-point link and the second personal portable device is still directly connected to the third personal portable device through a second point-to-point link.

10. The first personal portable device of claim 9, wherein:
the topology of the wireless network comprises a star topology having a center position and a plurality of endpoint positions;
at the initial time, the first personal portable device occupies an endpoint position of the plurality of endpoint positions, the second personal portable device occupies the center position, and the third personal portable device occupies another endpoint position of the plurality of endpoint positions;
the data stored within the first personal portable device comprises a succession data indicating a line of succession of personal portable devices to occupy the center position in a descending order of extents of interaction of each personal portable device with the wireless network; and
the first processor is further caused to cooperate with at least one processor of at least the third personal portable device to cause the first personal portable device to occupy the center position in response to the second personal portable device being removed from the wireless network at a time subsequent to the initial time and in response to the succession data indicating that the first personal portable device is next in the line of succession after the second personal portable device.

11. The first personal portable device of claim 9, wherein:
the topology of the wireless network comprises a chain topology; and
the data stored within the first personal portable device comprises an ordering data indicating an order of positions for personal portable devices to occupy within the topology of the wireless network in an order based on extents of interaction of each personal portable device with the wireless network.

12. The first personal portable device of claim 1, wherein:
the first processor of the first personal portable device is further caused to cooperate with a second processor of the second personal portable device and a third processor of a third personal portable device to exchange a first audio data through the wireless network to enable a user of the first, second and third personal portable devices to hear audio represented by the first audio data;
the second personal portable device is linked through a second point-to-point link with the third personal portable device such that at least a portion of the first audio data is relayed between the first and third personal portable devices through the second personal portable device; and
at least the first and third personal portable devices store a data indicating a personal portable device that each of the first and third personal portable devices will attempt to establish a new point-to-point link with in response to the removal of the second personal portable device from the network.

13. The first personal portable device of claim 12, wherein:
one of the first, second and third personal portable devices is a wireless earphone to audibly output a first audio channel of the first audio data; and
another of the first, second and third personal portable devices is a wireless headset to audibly output a second audio channel of the first audio data and to detect a second audio.

14. The first personal portable device of claim 12, wherein:
one of the first, second and third personal portable devices is a wireless earphone to audibly output the first audio data; and
another of the first, second and third personal portable devices is a wireless remote control to enable control of a characteristic of the first audio.

15. A method of increasing resiliency of a wireless network comprising a plurality of point-to-point links linking a plurality of personal portable devices occupying positions within the topology of the wireless network, the method comprising:
comparing a first extent of interaction with the wireless network of a first personal portable device of the plurality of personal portable devices with a second extent of interaction with the wireless network of a second personal portable device on a recurring basis;
causing at least the first and second personal portable devices to cooperate to move the first personal portable device from one position in the topology of the wireless network to a different position in the topology of the wireless network in response to a result of comparing the first and second extents of interaction; and
wherein the first and second extents of interaction are measured as one of a group consisting of:
relative portions of a time period during which each of the first and second personal portable devices are within the wireless network such that each of the first and second personal portable devices are each accessible to at least one other personal portable device through the network; and
relative portions of a time period during which each of the first and second personal portable devices exchange data with at least one other personal portable device through the network.

16. The method of claim 15, wherein:
- the topology of the wireless network comprises a star topology having a center position and an endpoint position; and
- the causing of at least the first and second personal portable devices to cooperate to move the first personal portable device comprises causing the first and second personal portable devices to cooperate to cause the first and second personal portable devices to exchange occupying the center and endpoint positions.

17. The method of claim 16, wherein the first and second personal portable devices are caused to cooperate to move the first personal portable device from the endpoint position to the center position in response to a result of comparing the first and second extents of interaction being that the first extent of interaction is greater than the second extent of interaction.

18. The method claim 15, wherein:
- the topology of the wireless network comprises a chain topology having an endpoint position and a midpoint position; and
- the causing of at least the first and second personal portable devices to cooperate to move the first personal portable device comprises causing the first and second personal portable devices to cooperate to cause the first and second personal portable devices to exchange occupying the endpoint and midpoint positions.

19. The method claim 18, wherein:
- the endpoint position is meant to be occupied by a personal portable device of the wireless network having the greatest extent of interaction with the network; and
- the first and second personal portable devices are caused to cooperate to move the first personal portable device from the midpoint position to the endpoint position in response to a result of comparing the first and second extents of interaction being that the first extent of interaction is greater than the second extent of interaction.

20. The method of claim 15, wherein the causing of at least the first and second personal portable devices to cooperate to move the first personal portable device comprises causing the first and second personal portable devices to cooperate to establish a first point-to-point link consistent with the first personal portable device occupying the different position and to remove a second point-to-point link that is not consistent with the first personal portable device occupying the different position.

21. The method of claim 15, wherein the causing of at least the first and second personal portable devices to cooperate to move the first personal portable device comprises causing the first and second personal portable devices to exchange identities such that the first personal portable device is presented on the wireless network as the second personal portable device and the second personal potable device is presented on the wireless network as the first personal portable device.

22. The method of claim 15, further comprising storing data within the first personal portable device indicating an identity of a third personal portable device of the plurality of personal portable devices to attempt to establish a new point-to-point link with in response to a removal of the second personal portable device from a position in between the first and third personal portable devices in the topology of the wireless network, wherein the storing of the data indicating the identity of the third personal portable device occurs at an initial time where the first personal portable device is still directly connected to the second personal portable device through a first point-to-point link and the second personal portable device is still directly connected to the third personal portable device through a second point-to-point link.

23. The method of claim 22, wherein:
- the topology of the wireless network comprises a star topology having a center position and a plurality of endpoint positions;
- at the initial time, the first personal portable device occupies an endpoint position of the plurality of endpoint positions, the second personal portable device occupies the center position, and the third personal portable device occupies another endpoint position of the plurality of endpoint positions;
- the data stored within the first personal portable device comprises a succession data indicating a line of succession of personal portable devices to occupy the center position in a descending order of extents of interaction of each personal portable device with the wireless network; and
- the method further comprises causing at least first and third personal portable devices to cooperate to cause the first personal portable device to occupy the center position in response to the second personal portable device being removed from the wireless network at a time subsequent to the initial time and in response to the succession data indicating that the first personal portable device is next in the line of succession after the second personal portable device.

24. The method of claim 22, wherein:
- the topology of the wireless network comprises a chain topology; and
- the data stored within the first personal portable device comprises an ordering data indicating an order of positions for personal portable devices to occupy within the topology of the wireless network in an order based on extents of interaction of each personal portable device with the wireless network.

25. The method of claim 15, further comprising:
- exchanging a first audio data through the wireless network to enable a user of the first, second and third personal portable devices to hear audio represented by the first audio data, wherein the first and second personal portable devices are linked through a first point-to-point link and the second and third personal portable devices are linked through a second point-to-point link such that at least a portion of the first audio data is relayed between the first and third personal portable devices through the second personal portable device; and
- storing in at least the first and third personal portable devices a data indicating a personal portable device that each of the first and third personal portable devices will attempt to establish a new point-to-point link with in response to the removal of the second personal portable device from the network.

26. The method of claim 25, wherein:
- one of the first, second and third personal portable devices is a wireless earphone to audibly output a first audio channel of the first audio data; and
- another of the first, second and third personal portable devices is a wireless headset to audibly output a second audio channel of the first audio data and to detect a second audio.

27. The method of claim 25, wherein:
- one of the first, second and third personal portable devices is a wireless earphone to audibly output the first audio data; and another of the first, second and third personal portable devices is a wireless remote control to enable control of a characteristic of the first audio.

28. A first personal portable device to interact with a wireless network having a topology having a first point-to-point link to directly connect the first personal portable device to a second personal portable device, the first personal portable device comprising:
a first processor;
a first wireless transceiver operable by the first processor to enable communications across the wireless network with the second personal portable device; and
a first storage accessible to the first processor in which is stored a first routine comprising a sequence of instructions, that when executed by the first processor, causes the first processor to:
store within the first personal portable device an indication of a first extent of interaction of the first personal portable device with the wireless network;
receive through the first wireless transceiver an indication of a second extent of interaction of the second personal portable device with the wireless network;
compare the first and second extents of interaction on a recurring basis; and
cooperate with a second processor of the second personal portable device within the wireless network to move the first personal portable device from occupying one position within the topology of the wireless network to occupying a different position within the topology of the network in response to a result of a comparison between the first and second extents of interaction; and
wherein the cooperation of the first processor with the second processor to move the first personal portable device from occupying the one position to occupying the different position comprises the first processor being further caused to cooperate with the second to cause the first and second personal portable devices to exchange identities such that the first processor causes the first personal portable device to be presented on the wireless network as the second personal portable device and the second processor causes the second personal potable device to be presented on the wireless network as the first personal portable device.

29. The first personal portable device of claim 28, wherein the first and second extents of interaction are measured as one of a group consisting of:
relative portions of a time period during which each of the first and second personal portable devices are within the wireless network such that each of the first and second personal portable devices are each accessible to at least one other personal portable device through the network; and
relative portions of a time period during which each of the first and second personal portable devices exchange data with at least one other personal portable device through the network.

30. The first personal portable device of claim 28, wherein the first processor is further caused to cooperate with a second processor of the second personal portable device in comparing the first and second extents of interaction.

31. The first personal portable device of claim 28, wherein:
the topology of the wireless network comprises a star topology having a center position and an endpoint position; and
the cooperation of the first processor with at least one processor of at least one other personal portable device within the wireless network to move the first personal portable device from occupying the one position to occupying the different position comprises the first processor being further caused to cooperate with a second processor of the second personal portable device to cause the first and second personal portable devices to exchange occupying the center and endpoint positions.

32. The first personal portable device of claim 31, wherein the first processor is caused to cooperate with the second processor to move the first personal portable device from the endpoint position to the center position in response to a result of comparing the first and second extents of interaction being that the first extent of interaction is greater than the second extent of interaction.

33. The first personal portable device of claim 28, wherein:
the topology of the wireless network comprises a chain topology having an endpoint position and a midpoint position; and
the cooperation of the first processor with at least one processor of at least one other personal portable device within the wireless network to move the first personal portable device from occupying the one position to occupying the different position comprises the first processor being further caused to cooperate with a second processor of the second personal portable device to cause the first and second personal portable devices to exchange occupying the endpoint and midpoint positions.

34. The first personal portable device of claim 33, wherein:
the endpoint position is to be occupied by a personal portable device of the wireless network having the greatest extent of interaction with the network; and
the first processor is caused to cooperate with the second processor to move the first personal portable device from the midpoint position to the endpoint position in response to a result of comparing the first and second extents of interaction being that the first extent of interaction is greater than the second extent of interaction.

35. A method of increasing resiliency of a wireless network comprising a plurality of point-to-point links linking a plurality of personal portable devices occupying positions within the topology of the wireless network, the method comprising:
comparing a first extent of interaction with the wireless network of a first personal portable device of the plurality of personal portable devices with a second extent of interaction with the wireless network of a second personal portable device on a recurring basis;
causing at least the first and second personal portable devices to cooperate to move the first personal portable device from one position in the topology of the wireless network to a different position in the topology of the wireless network in response to a result of comparing the first and second extents of interaction; and
wherein the causing of at least the first and second personal portable devices to cooperate to move the first personal portable device comprises causing the first and second personal portable devices to exchange identities such that the first personal portable device is presented on the wireless network as the second personal portable device and the second personal potable device is presented on the wireless network as the first personal portable device.

36. The method of claim 35, wherein the first and second extents of interaction are measured as one of a group consisting of:
relative portions of a time period during which each of the first and second personal portable devices are within the wireless network such that each of the first and second personal portable devices are each accessible to at least one other personal portable device through the network; and relative portions of a time period during which each of the first and second personal portable devices exchange data with at least one other personal portable device through the network.

37. The method of claim 35, wherein:

the topology of the wireless network comprises a star topology having a center position and an endpoint position; and the causing of at least the first and second personal portable devices to cooperate to move the first personal portable device comprises causing the first and second personal portable devices to cooperate to cause the first and second personal portable devices to exchange occupying the center and endpoint positions.

38. The method of claim 37, wherein the first and second personal portable devices are caused to cooperate to move the first personal portable device from the endpoint position to the center position in response to a result of comparing the first and second extents of interaction being that the first extent of interaction is greater than the second extent of interaction.

39. The method claim 35, wherein:

the topology of the wireless network comprises a chain topology having an endpoint position and a midpoint position; and the causing of at least the first and second personal portable devices to cooperate to move the first personal portable device comprises causing the first and second personal portable devices to cooperate to cause the first and second personal portable devices to exchange occupying the endpoint and midpoint positions.

40. The method claim 39, wherein:

the endpoint position is meant to be occupied by a personal portable device of the wireless network having the greatest extent of interaction with the network; and the first and second personal portable devices are caused to cooperate to move the first personal portable device from the midpoint position to the endpoint position in response to a result of comparing the first and second extents of interaction being that the first extent of interaction is greater than the second extent of interaction.

* * * * *